(12) United States Patent
Sako et al.

(10) Patent No.: US 6,278,677 B1
(45) Date of Patent: *Aug. 21, 2001

(54) DISK LOADING DEVICE HAVING DISK HOLDING TRAY SEPARABLE INTO A PLURALITY OF SEGMENTS

(75) Inventors: Shinichi Sako; Shoji Taniguchi; Hideto Takeuchi; Yoshifusa Fujioka; Masayuki Isobe; Takahiko Suezawa, all of Higashihiroshima (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/978,151

(22) Filed: Nov. 25, 1997

(30) Foreign Application Priority Data

Nov. 29, 1996 (JP) .................................................. 8-320571

(51) Int. Cl.[7] .................................................. G11B 33/02
(52) U.S. Cl. .............................................................. 369/77.1
(58) Field of Search ............................ 369/35, 77.1, 178, 369/191

(56) References Cited

U.S. PATENT DOCUMENTS

| | | | |
|---|---|---|---|
| 4,653,039 | * | 3/1987 | Ueno et al. .......................... 369/75.2 |
| 5,177,722 | | 1/1993 | Nakamichi et al. .................... 369/36 |
| 5,226,032 | * | 7/1993 | Ikedo et al. ........................... 369/178 |
| 5,764,616 | * | 6/1998 | Kim et al. ............................. 369/191 |
| 5,798,997 | * | 8/1998 | Ware et al. .......................... 369/75.2 |

FOREIGN PATENT DOCUMENTS

| | | |
|---|---|---|
| 3026600A1 | 2/1982 | (DE) . |
| 0658893A1 | 6/1995 | (EP) . |
| 2653259 | 4/1991 | (FR) . |
| 07282520A | 10/1995 | (JP) . |
| 7282520 | 10/1995 | (JP) . |

\* cited by examiner

*Primary Examiner*—David Davis

(57) ABSTRACT

In a disk loading device, an upper tray is moved by pinions among a loading and unloading position for loading and unloading a disk outside a housing, a storage position for storing the disk inside the housing, and a reproduction position for reproducing the disk at the back of the housing. A lower tray is held by a lock lever onto the upper tray between the loading and unloading position and the storage position. As the upper tray is moved from the storage position to the reproduction position, the lower tray is released from the lock lever by a hold releasing rack provided to the housing. Outside the housing, since the lower tray is held onto the upper tray, the strength of the upper tray is increased. Inside the housing, since the lower tray is released from the upper tray, the upper tray is moved alone. This allows the drive mechanism to drive the upper tray alone, making the configuration of the drive mechanism simple. Therefore, it is possible to simplify the configuration of the drive mechanism without a larger housing.

26 Claims, 25 Drawing Sheets

FIG. 3(a)
FIG. 3(b)
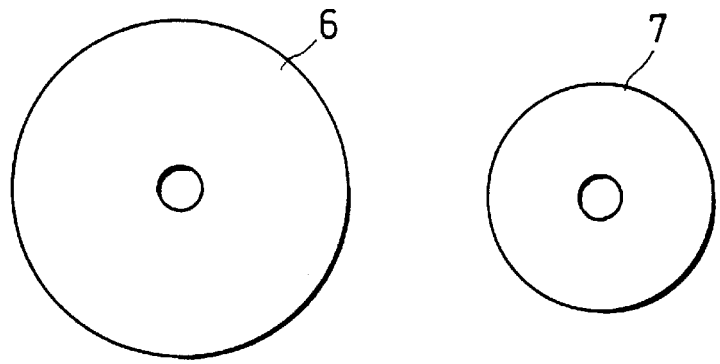
FIG. 4(a)
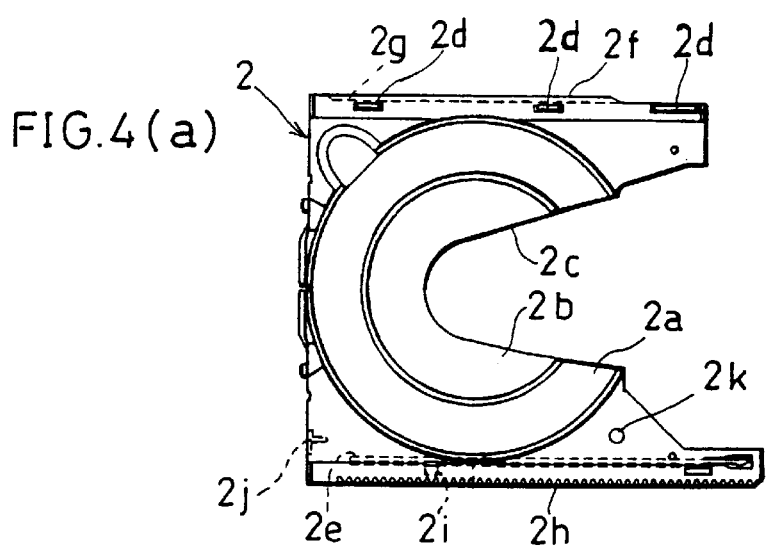
FIG. 4(b)
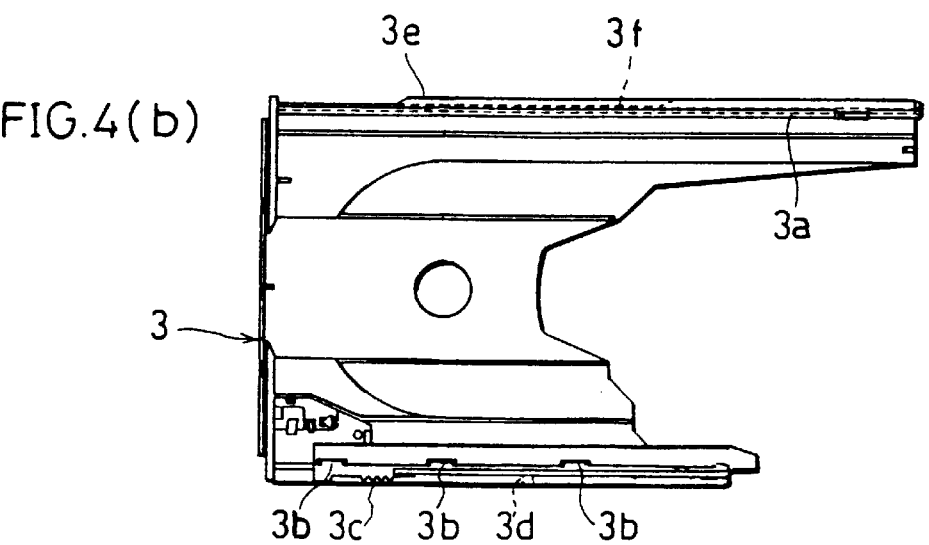

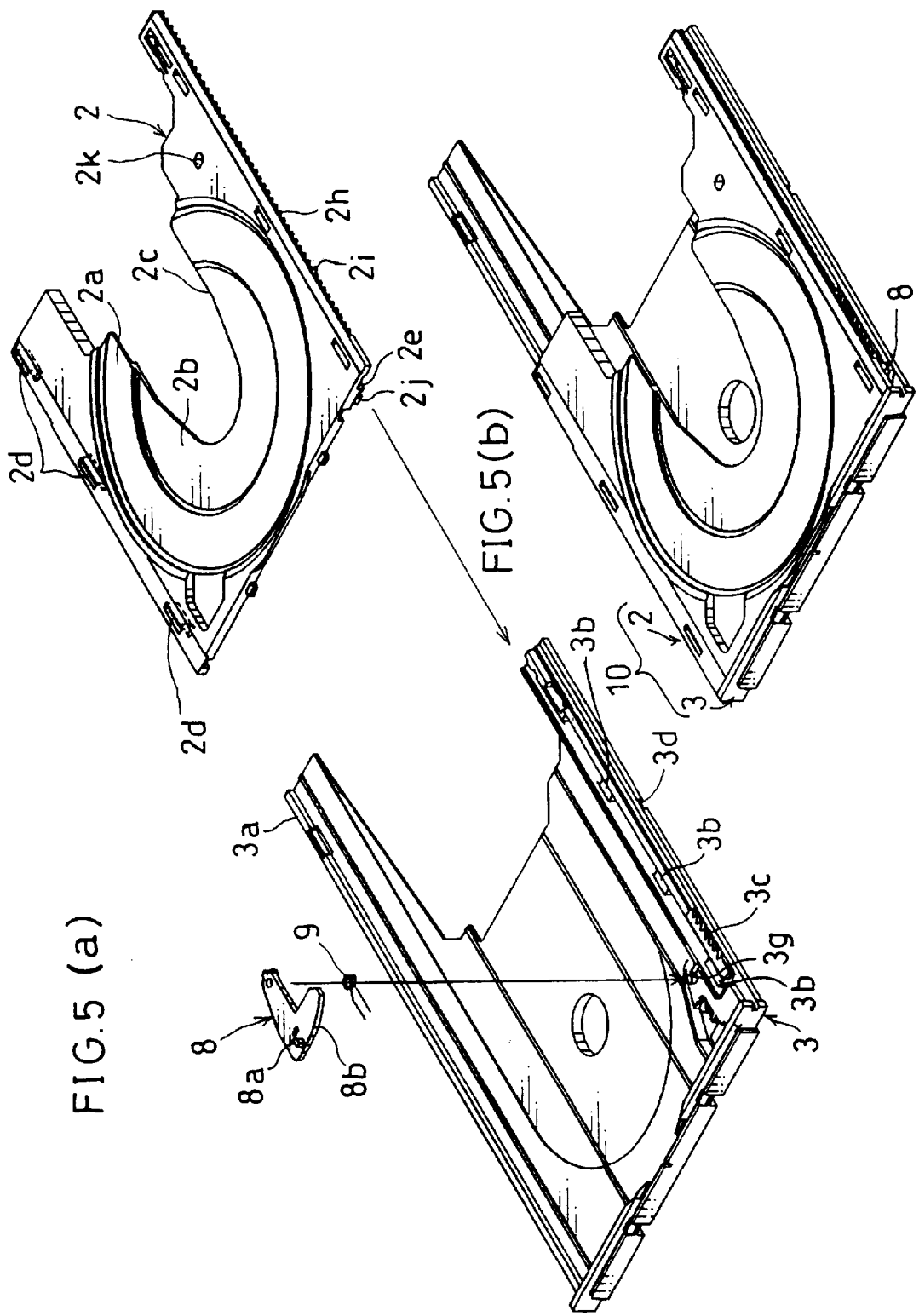

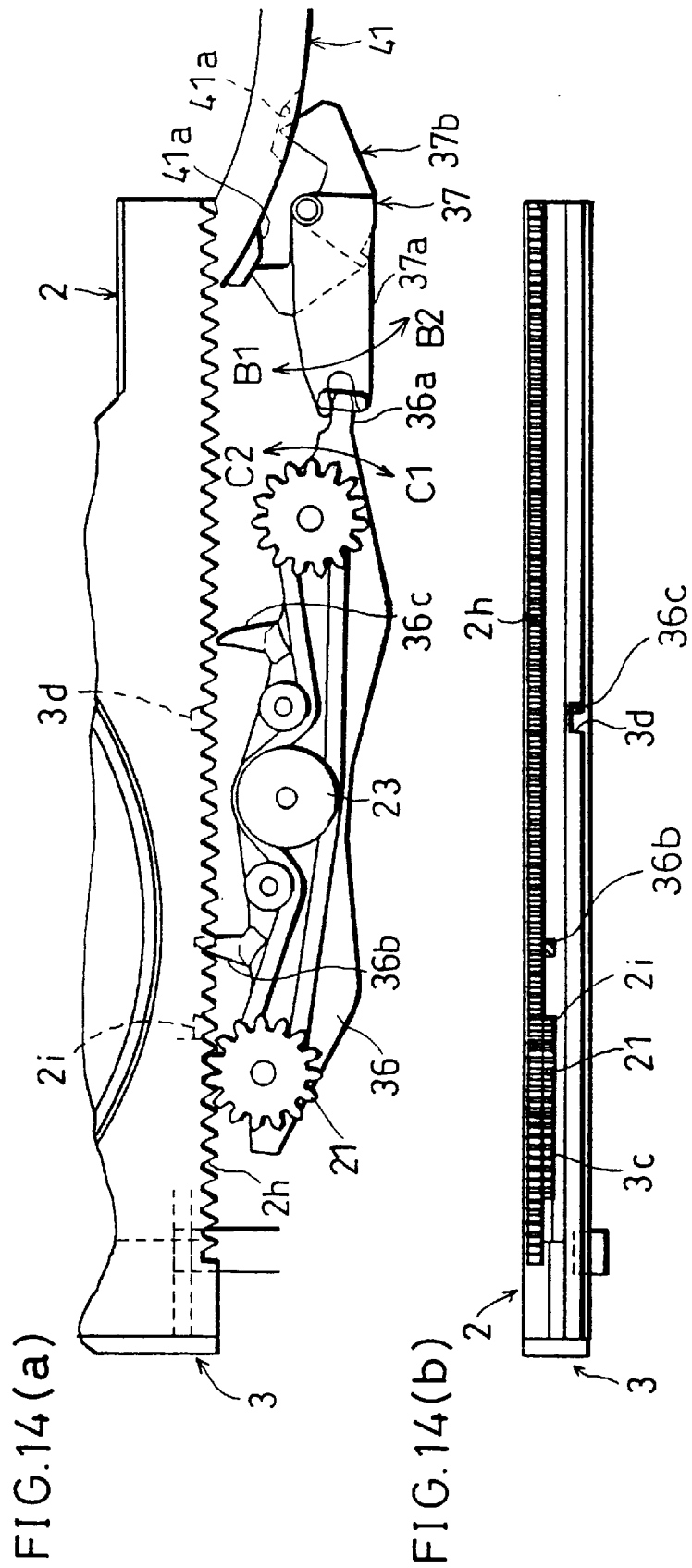

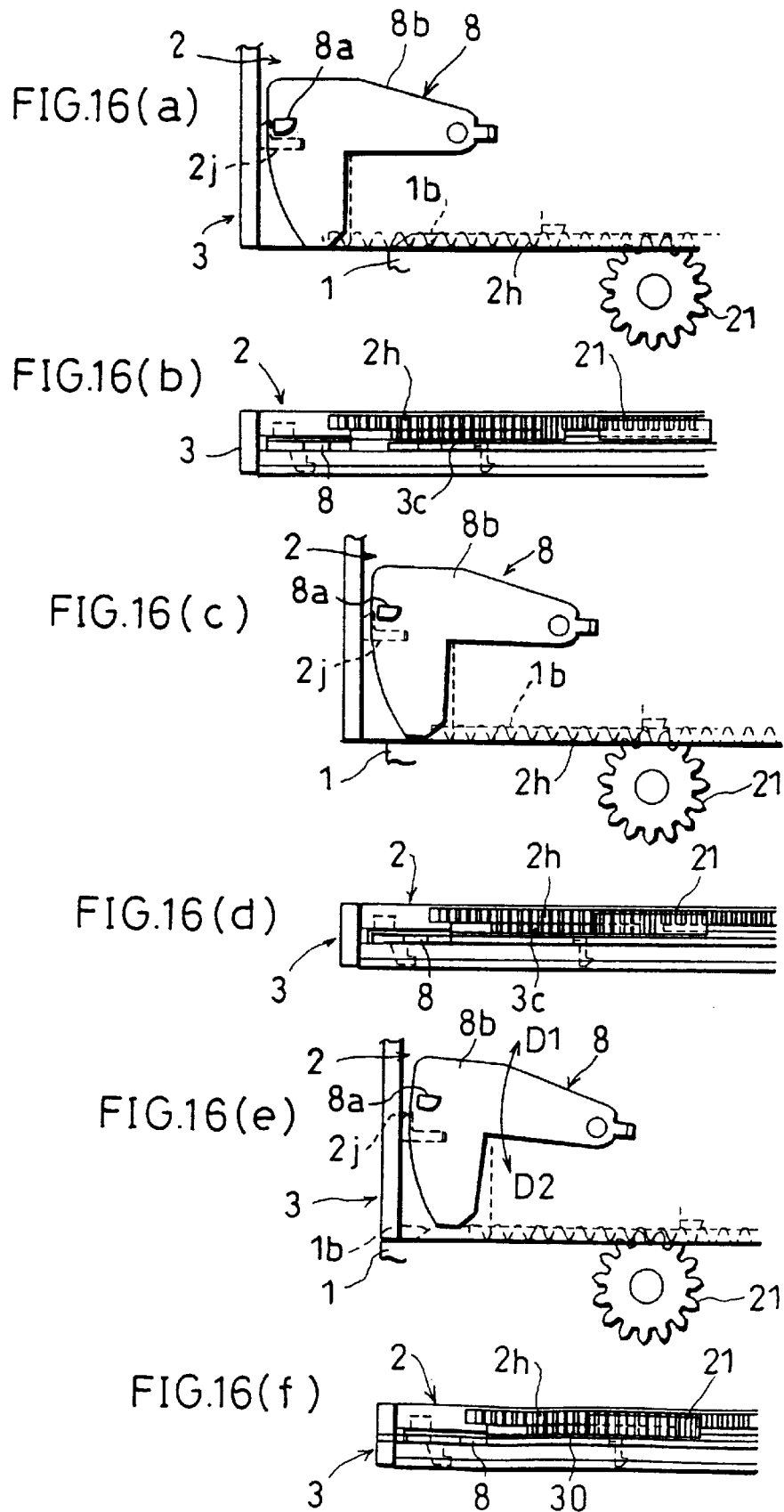

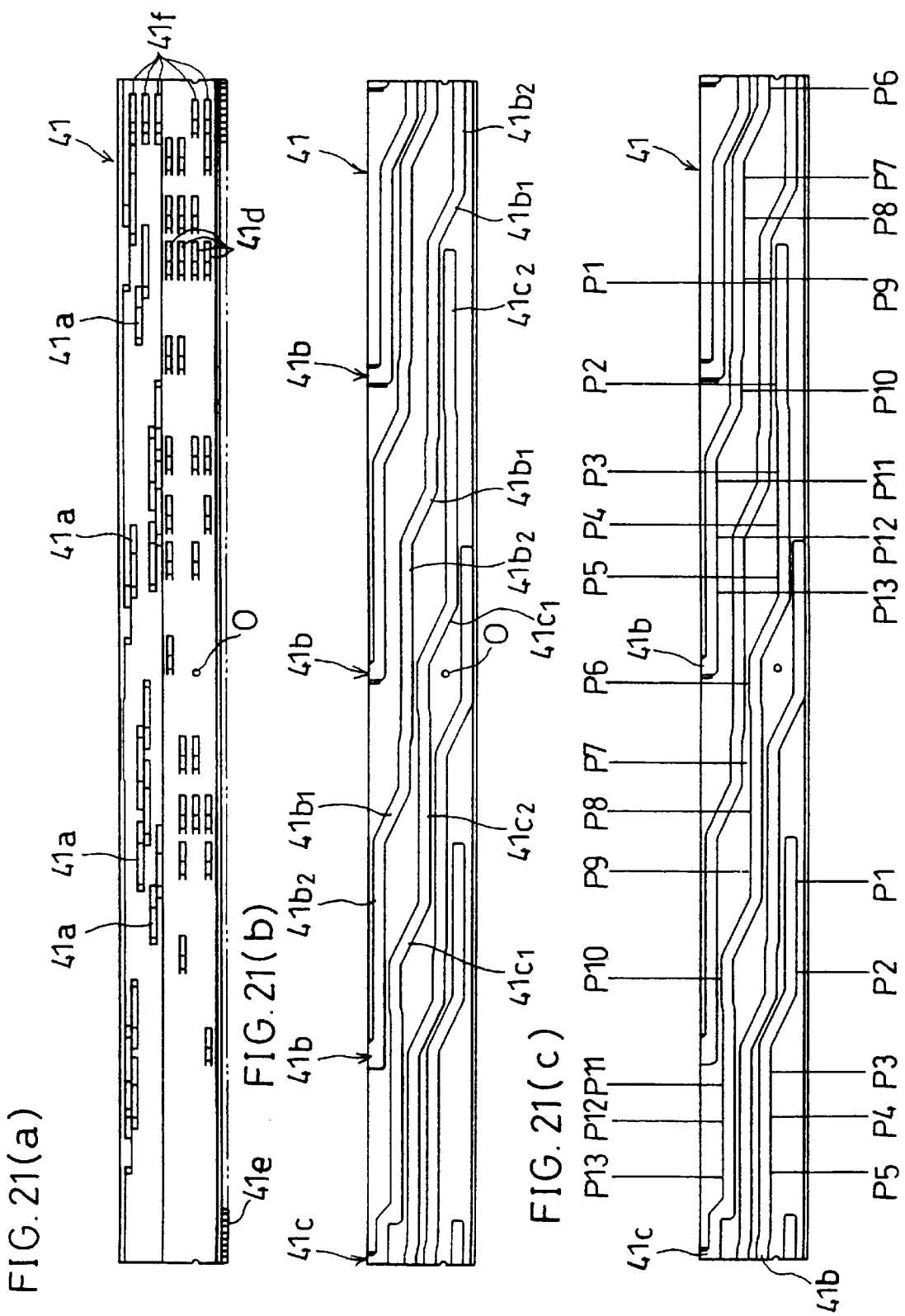

DISK LOADING DEVICE HAVING DISK HOLDING TRAY SEPARABLE INTO A PLURALITY OF SEGMENTS

FIELD OF THE INVENTION

The present invention relates to a disk loading device for loading disks as information recording mediums, such as optical disks and magneto-optic disks, into a disk apparatus main body.

BACKGROUND OF THE INVENTION

Optical disks and magneto-optic disks (hereinafter will be referred to simply as disks) have recently gained wide popularity as information recording mediums, and created demands for a disk loading device capable of storing a plurality of disks at one time to realize easy handling of a plurality of disks. Accordingly, various types of disk loading devices have been invented.

However, those types of disk loading devices do not allow the user to load, unload or replace a disk while another disk is in reproduction or recording. Therefore, the user must stop the reproduction or recording temporarily or wait until the reproduction or recording is finished, before he can load, unload or replace that disk. In addition, such disk loading devices tend to be large so as to allow storage of a plurality of disks. Accordingly, a new type of disk loading device is in demand to solve these inconveniences.

Japanese Laid-Open Patent Application No. 7-282520/1995 (Tokukaihei 7-282520) discloses a disk reproducing device which meets the requirements. The disk reproducing device includes a pair of a main tray and a subtray. The subtray moves a disk between a disk replacement position outside the housing and a reproduction position. The subtray is held by the main tray so as to be movable between the disk replacement position and a standby position inside the housing.

An individual rack is provided to the subtray and the main tray, and one pinion engages one of two racks. Specifically, the pinion is elevated and lowered along the rotation axis thereof by pinion moving means that includes a pinion elevating and lowering cam, and shifts to a position where it engages one of the two racks. The pinion elevating and lowering cam is a cylinder with a plurality of cam surfaces in accordance with the position of the pinion.

The disk reproducing device includes a fluctuation gear and a reproducing section elevating and lowering cam for elevating and lowering a reproducing mechanism. The reproducing section elevating and lowering cam is a cylinder cam with a plurality of cam surfaces in accordance with the position of the reproducing section, for elevating and lowering the reproducing section that includes a turn table, an optical pickup unit, etc. The fluctuation gear fluctuates depending upon the rotation direction of the motor and thereby rotates either the pinion elevating and lowering cam or the reproducing section elevating and lowering cam. Two kinds of cams can be driven with a single motor in this manner.

However, in the disk reproducing device, the pinion is driven upward and downward so as to engage the rack of one of the trays during the reciprocal movement of the main tray between the disk replacement position and the standby position and the reciprocal movement of the subtray between the standby position and the reproduction position. This requires both the subtray and the main tray to be provided with an individual rack, adding to the costs for the disk reproducing device.

A method of removing such inconvenience is to remove the subtray and change the configuration of the disk reproducing device so that the disk can be moved only by the main tray. This configuration, however, requires a portion of the main tray on which the disk is mounted to be movable between the disk replacement position and the reproduction position, and therefore that the main tray travel a longer distance than that in the previous configuration including the subtray. Consequently, the disk reproducing device needs a larger housing to allow for that travel distance for the main tray.

When the subtray and the main tray are both in the standby positions, one of those trays, not held by the pinion, might change its position on its own, and is disposed relative to the rack of the other tray. Consequently, when the pinion is elevated or lowered so as to move the disposed tray again, the rack of the tray and the pinion might possibly not engage each other.

Displacement of the rack is eliminated by slightly moving the pinion and thus correcting the engagement position of the pinion with the rack. According to this method, the pinion is slightly moved until the rack is back in the right engagement position, and then driven at a speed predetermined to move the tray. Therefore, the method requires a device for detecting that the rack has reached its right engagement position, and may complicate the controls of the tray moving means for driving the pinion.

Relative displacement between the racks can also be eliminated by moving the pinion as much as the racks have been disposed. According to the method, the pinion is horizontally moved until the pinion is in the right position to engage the disposed rack. Therefore, the method requires a mechanism for moving the pinion relative to the subtray or the main tray.

With the disk reproducing device, a pinion elevating and lowering cam and a reproducing section elevating and lowering cam are provided separately, one of the cams is selectively driven by a single motor. The drive mechanism turns the cams in fixed directions using the fluctuation gears engaging one of gears provided to the cams. Thus, selections from a plurality of pairs of trays (pairs of a subtray and a main tray) and upward and downward movements of the reproducing section in accordance with the pair of trays (hereinafter, will be inclusively referred to as reproduction preparatory movement) are executed in a predetermined sequence.

Therefore, after the reproduction preparatory movement for a disk on the top (bottom) shelf, the operation proceeds to a reproduction preparatory movement for a disk on a lower (upper) shelf. However, after the reproduction preparatory movements for the other shelves than the top and bottom shelves, the operation proceeds either to an upper shelf or to a lower shelf. Therefore, the cams need two cam surfaces of the same height on both sides of the highest cam surface and the lowest cam surface. In addition, a device may possibly be needed for detecting the position of the pinion and that of the reproducing section, and complicate the controls of the tray moving means.

With the disk reproducing device, while the main tray is moving between the standby position and the disk replacement position, the pinion engages only the rack of the main tray, not the rack of the subtray. Therefore, the subtray may possibly be moved and disposed relative to the main tray, while the main tray is being moved.

The pinion, when in the standby and reproduction positions and between those positions, does not engage the rack of the main tray, and is only held by the housing. An electrically driven holding mechanism is needed to hold the pinion, and the main tray needs to be so thick and strong to be held by the holding mechanism. The holding mechanism needs to release the main tray when the rack of the main tray engages the pinion. If the main tray is not released at the right timing, the main tray cannot shift from the holding state to the moving state.

With the disk reproducing device, in order that the reproducing section including the turn table and an optical pickup unit do not contact the moving disk during the turning movement of the reproducing section elevating and lowering cam, the reproducing section retreats downward relative to the subtray moving to the reproduction position, and when the subtray reaches the reproduction position the disk is scooped with the reproducing section moved upward. Then, a damper provided to the reproducing section so as to be turned up and down is lowered to secure the disk to the turn table. Therefore, a mechanism for vertically turning the damper is provided for that purpose only. Besides, since the damper is lowered obliquely, the disk cannot be firmly secured to the turn table in some cases.

The disk reproducing device requires a detecting device for detecting the disk replacement position, the standby position, and the reproduction position, a detecting device for detecting the position of the pinion (the rotation position of the pinion elevating and lowering cam), and a detecting device for detecting the position of the reproducing section (the rotation position of the reproducing section elevating and lowering cam), each detecting device being provided separately from the others. Moreover, in some cases, a detecting device for detecting the securing of the disk by the damper and the release of the securing needs to be provided. Therefore, the controls of the disk loading is carried out on the basis of the three or four kinds of detection signals from the detecting devices, which complicates the controls.

SUMMARY OF THE INVENTION

The present invention has as its principal object the provision of a disk loading device having a simply configured tray drive mechanism without a larger housing. Another important object of this invention is to provide a disk loading device that is free from the drawbacks mentioned above.

In order to accomplish the objects, a disk loading device in accordance with the present invention has:

a first tray provided so as to be freely movable with a disk thereon among a loading and unloading position for allowing loading and unloading of the disk outside a housing, a storage position for storing the disk inside the housing, and a reproduction position for reproducing the disk at the back of the storage position in the housing;

a second tray provided so as to be freely movable with the first tray thereon between the loading and unloading position and the storage position;

tray driving mechanism for driving and reciprocally moving the first tray among the three positions;

a holding member for holding the second tray onto the first tray; and hold releasing mechanism for releasing the hold by the holding member when the first tray moves from the storage position to the reproduction position.

The configuration allows the second tray to be held by the holding member onto the first tray between the loading and unloading position and the storage position, thereby enhancing the strength of the first tray between the loading and unloading position and the storage position. This realizes reliable movement of the disk between the loading and unloading position and the storage position. In addition, the tray driving mechanism only needs to drive the first tray, enabling the tray driving mechanism to be configured simply.

Also, the configuration, when moving the first tray from the storage position to the reproduction position, lets the hold releasing mechanism release the second tray that is held onto the first tray by the holding member, and thereby moves the first tray alone. Since only the first tray is moved from the storage position to the reproduction position in this manner, it is needless to provide the disk loading device with a large housing.

This makes it possible to easily simplify components and structure, reduce manufacturing costs, facilitate controls of loading operation, and reduce the size of the disk loading device.

For a fuller understanding of the nature and advantages of the invention, reference should be made to the ensuing detailed description taken in conjunction with the accompanying drawings.

BRIEF DESCRIPTION OF THE DRAWINGS

FIGS. 3(a) and 3(b) are plan views showing two kinds of disks loaded in the disk loading device.

FIG. 4(a) is a plan view showing a configuration of the upper tray.

FIG. 4(b) is a plan view showing a configuration of the lower tray.

FIG. 5(a) is a perspective view showing a configuration of the upper tray and the lower tray being separated from each other.

FIG. 5(b) is a perspective view showing a configuration of the upper tray and the lower tray constituting a tray assembly.

FIGS. 14(a) and 14(b) are a plan view and a side view, respectively, showing the locations of the two pinions when the upper tray is moved from the storage position to the loading and unloading position.

FIGS. 16(a), 16(c) and 16(e) are plan views showing the holding state of the lower tray onto the upper tray by a lock lever in the loading and unloading position, in an immediately prior position to the storage position in a movement from the loading and unloading position, and in a storage position respectively.

FIGS. 16(b), 16(d) and 16(f) are side views respectively corresponding to the holding states shown in FIGS. 16(a), 16(c) and 16(e).

FIG. 21(a) is a development drawing showing an outer circumferencial surface of the main cam, shown in FIG. 19, projected and stretched like a narrow band.

FIGS. 21(b) and 21(c) are development drawings showing an inner circumferencial surface of the main cam, shown in FIG. 19, projected and stretched like a narrow band.

DESCRIPTION OF THE EMBODIMENTS

Referring to FIGS. 1 through 16, the following description will discuss an embodiment in accordance with the present invention.

Figure 2:
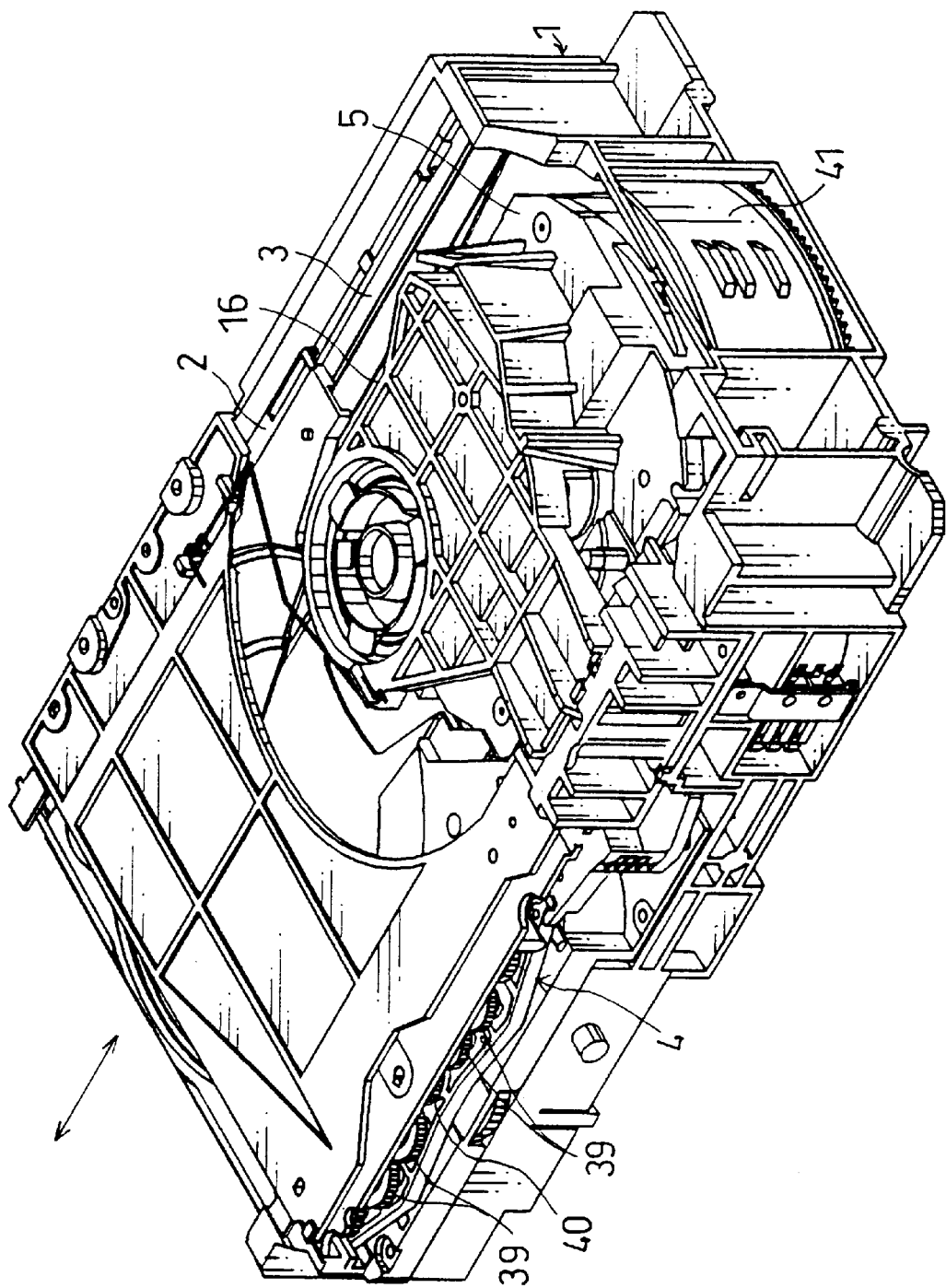
FIG. 2 is a perspective view showing the appearance of the disk loading device.

A disk loading device of the present embodiment includes, as shown in FIG. 2, a housing 1 encasing, for example, an upper tray 2, a lower tray 3, a tray driving mechanism 4, a reproducing mechanism unit 5, and a disk securing mechanism 16.

The upper tray 2 and the lower tray 3 are attached to the housing 1 so as to be freely movable in the directions indicated by the arrows, transporting a disk 6 shown in FIG. 3(a) or a disk 7 shown in FIG. 3(b) as an information recording medium from outside to the reproducing mechanism unit 5 located in the housing 1 at the back thereof and vice versa.

The upper tray 2 as a first tray, as shown in FIG. 4(a), has two round concave portions 2a and 2b of different diameters. The concave portion 2a is formed to store the disk 6 of a greater diameter shown in FIG. 3(a), whereas the concave portion 2b is formed to store the disk 7 of a smaller diameter shown in FIG. 3(b).

Although either the disk 6 or the disk 7 can be used throughout the following description including the second embodiment, only the disk 6 will be used for convenience in the following description.

Figure 1A:
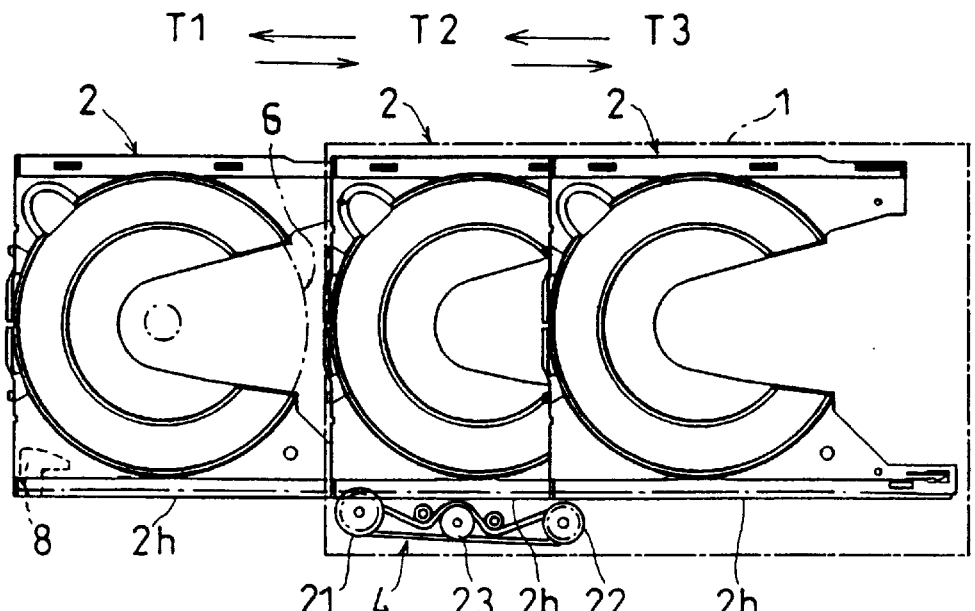
FIG. 1(a) is a plan view showing movements between three positions of an upper tray and a lower tray of a disk loading device of an embodiment in accordance with the present invention.

The upper tray 2 transports the disk 6 to a loading and unloading position T1, a storage position T2, and a reproduction position T3 as shown in FIG. 1(a). The loading and unloading position T1 is for loading and unloading of the disk 6 into and out of the upper tray 2 outside the housing 1. The storage position T2 is for storing the disk 6 inside the housing 1 and is in the neighborhood of an open portion 1a (shown in FIG. 1(a)) through which the upper tray 2 moves into and out of the housing 1. The reproduction position T3 is located in the housing 1 at the back of the storage position T2 for reproduction of the disk 6.

The upper tray 2 has a notch 2c that has a U-like shape. The notch 2c is formed so that a pickup 51b (will be described later in detail; see FIG. 6 or 9) moves up to where it can read and write information on the disk 6 and so that a turn table 51a (will be described later in detail; see FIG. 9) can scoop up the disk 6 from below. The upper tray 2, as shown in FIGS. 4(a) and 5(a), has guiding sections 2d on its lower surface along one of its sidelines extending parallel to the direction of movement, and has a guide rail 2e on its lower surface along the opposing sideline.

Three guiding sections 2d are provided, each having an L-like shape and protruding downward. The guide rail 2e has the same structure as the guiding section 2d and is provided along the sideline of the upper tray 2 for almost its whole length.

The upper tray 2 has a position detecting cam 2f and 2g for detecting the position of the upper tray 2 on its side surface where the guiding section 2d are disposed. The position detecting cam 2f has almost the same length as the diameter of the concave portion 2a, with one end on the edge of the upper tray 2 near the open portion 1a (front edge). The position detecting cam 2g is formed in groove-like shape beneath the position detecting cam 2f, and extends from a neighborhood of the front edge to the back edge of the upper tray 2.

The upper tray 2 has a rack 2h on its side surface where the guide rail 2e is disposed. The rack 2h is provided so as to cover almost the whole length of that side surface except a predetermined part near the front edge. The rack 2h has a collide-and-hold section 2i protruding downward from a predetermined part of the rack 2h. The collide-and-hold section 2i is formed to collide with a lock claw 36b (will be described later in detail; see FIG. 13). In addition, a stopper 2j is provided near the rack 2h on the front edge. The stoppers 2j has an L-like shape and protrudes downward from the lower surface of the upper tray 2, so as to catch and hold a lock lever 8 (will be described later in detail).

The upper tray 2 is provided on the inner side of the rack 2h with a guide hole 2k piercing through the upper tray 2. The guide hole 2k, as will be described later, is for the reproducing mechanism unit 5 to hold the upper tray 2.

The lower tray 3 as a second tray, as shown in FIGS. 4(b) and 5(b), has a guide rail 3a on its upper surface along its sideline extending parallel to the direction of movement, and has guide sections 3b on its upper surface along the opposing sideline.

The guide rail 3a has an L-like shape protruding upward and is provided along the sideline of the lower tray 3 for almost its whole length. Three guide sections 3b are provided at appropriate intervals between thereof, each being a small plate-like piece protruding inward. The lower tray 3 is held to the upper tray 2 by the guiding sections 2d catching and holding the guide rail 3a and the guide rail 2e catching and holding the guide sections 3b. Upper tray 2 can freely slide between the storage position T2 and the reproduction position T3.

The lower tray 3 has a partial rack 3c on its side surface where the guide section 3b is disposed. The partial rack 3c as an auxiliary rack is provided to be very short, compared to the rack 2h, and is separated from the edge of the lower tray 3 near the open portion 1a (front edge) by a predetermined distance. The partial rack 3c and the rack 2h both engage pinions 21 and 22 (will be described later in detail). In addition, the lower tray 3 has a notch 3d in almost the middle of the side surface where the rack 2h is provided. The notch 3d is formed to catch a lock claw 36c (will be described later in detail).

The lower tray 3 has position detecting cams 3e and 3f for detecting the position of the lower tray 3 on its side surface where the guide rail 3a of the lower tray 3 is disposed. The position detecting cam 3e is formed to cover the whole length of the side surface except the segment from the front edge of the lower tray 3 to a neighborhood of a point opposing the back end of the partial rack 3c. The position detecting cam 3f is formed in a groove-like shape beneath the position detecting cam 3e, and extends from a point which is behind the front end of the position detecting cam 3e to the back edge of the lower tray 3.

A tray assembly 10 is constituted by the upper tray 2 and the lower tray 3 configured as above, as well as the lock lever 8 as a holding member and a spring 9.

The lock lever 8 includes an L-shaped, plate-like lever main body 8b. The lever main body 8b is supported by a pin 3g provided near the partial rack 3c of the lower tray 3 so as to turn freely. The spring 9 is disposed between the lock lever 8 and the pin 3g. As shown in FIG. 5(b), the lock lever 8 is pressed by the spring 9 so as to stick out its head. The lock lever 8 has a protrusion section 8a, protruding upward, for being caught by the stopper 2j.

The lock lever 8 with such a structure lets the upper tray 2 hold the lower tray 3 as shown in FIG. 16(a).

Figure 6:
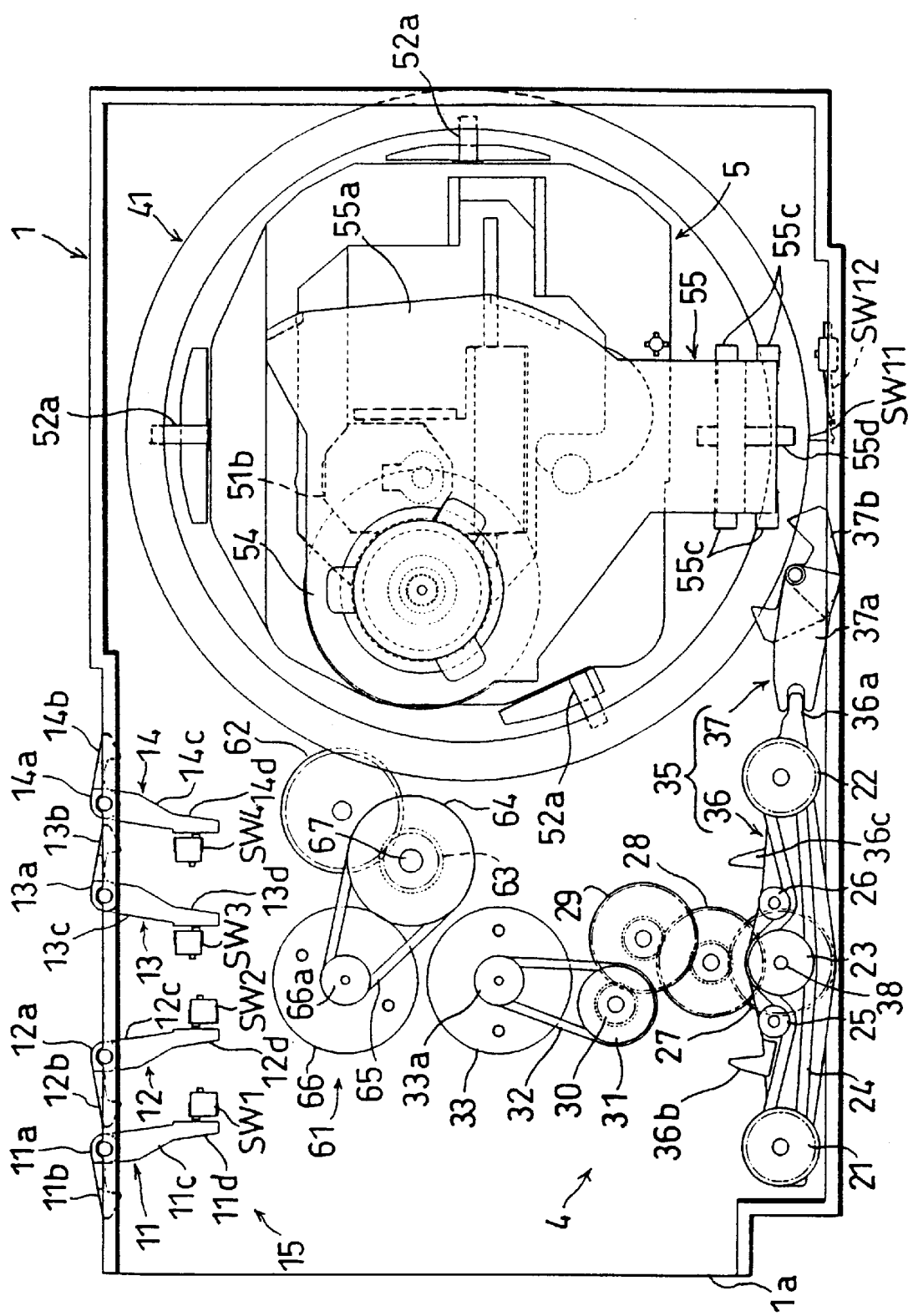
FIG. 6 is a plan view showing a layout inside the disk loading device.

A tray position detecting mechanism 15 shown in FIG. 6 detects the positions of the upper tray 2 and the lower tray 3. The tray position detecting mechanism 15 is provided on a side wall of the housing 1, and constituted by four switch levers 11 through 14 and tray position detecting switches (hereinafter will be referred to as switches) SW1 through SW4.

The switch levers 11 through 14 are attached to the housing 1 so as to turn freely, and turns on or off the respective switches SW1 through SW4 in conjunction with the operation of the tray assembly 10.

The switch lever 11 for operating the switch SW1 is constituted by a supporting section 11a, a contact section 11b, a lever section 11c, and an operating section 11d. The supporting section 11a is formed in a column shape so as to be supported by the housing 1 and to turn freely. The contact section 11b is provided to the supporting section 11a so as to contact the position detecting cam 3f. The lever section 11c is provided so as to extend from the lower end of the supporting section 11a toward the switch SW1 provided inside the housing 1. The operating section 11d is a flat plate provided on the tip of the lever section 11c and operates the actuator of the switch SW1 by a turning movement of the lever section 11c.

The switch lever 12 for operating the switch SW2 is constituted in the same manner as the switch lever 11, namely, by a supporting section 12a, a contact section 12b, a lever section 12c, and an operating section 12d. The contact section 12b is provided to the supporting section 12a so as to contact the position detecting cam 3e.

The switch lever 13 for operating the switch SW3 is constituted by a supporting section 13a, a contact section 13b, a lever section 13c, and an operating section 13d. The supporting section 13a is formed in a column shape so as to be supported by the housing 1 and to turn freely. The contact section 13b is provided to the supporting section 13a so as to contact the position detecting cam 2g. The lever section 13c is provided so as to extend from the lower end of the supporting section 13a toward the switch SW3 provided inside the housing 1. The operating section 13d is a flat plate provided on the tip of the lever section 13c, and operates the actuator of the switch SW3 by a turning movement of the lever section 13c.

The switch lever 14 for operating the switch SW4 is constituted in the same manner as the switch lever 13, namely, by a supporting section 14a, a contact section 14b, a lever section 14c, and an operating section 14d. The contact section 14b is provided to the supporting section 14a so as to contact the position detecting cam 2f.

As shown in FIG. 6, the switches SW1 through SW4 are pressed by springs (not shown) when they are not in contact with the respective position detecting cams 2f, 2g, 3e, and 3f.

The tray position detecting mechanism 15 configured in this manner detects the positions of the upper tray 2 and the lower tray 3 by combinations of the ON and OFF states of the four switches SW1 through SW4. The following description will explain the ON and OFF states of the switches SW1 through SW4 in accordance with the positions of the upper tray 2 and the lower tray 3.

Figure 8A:
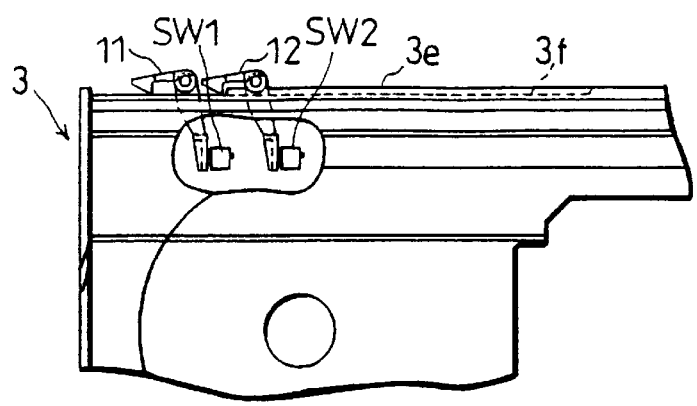
FIGS. 8(a) through 8(c) are plan views showing an ON state and an OFF state of tray position detecting switches in accordance with the position of the lower tray of the disk loading devices of the embodiment and another embodiment in accordance with the present invention.
Figure 8B:
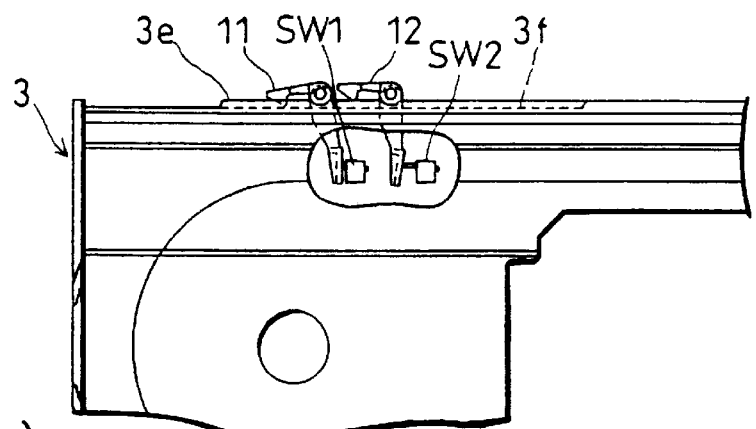
Figure 8C:
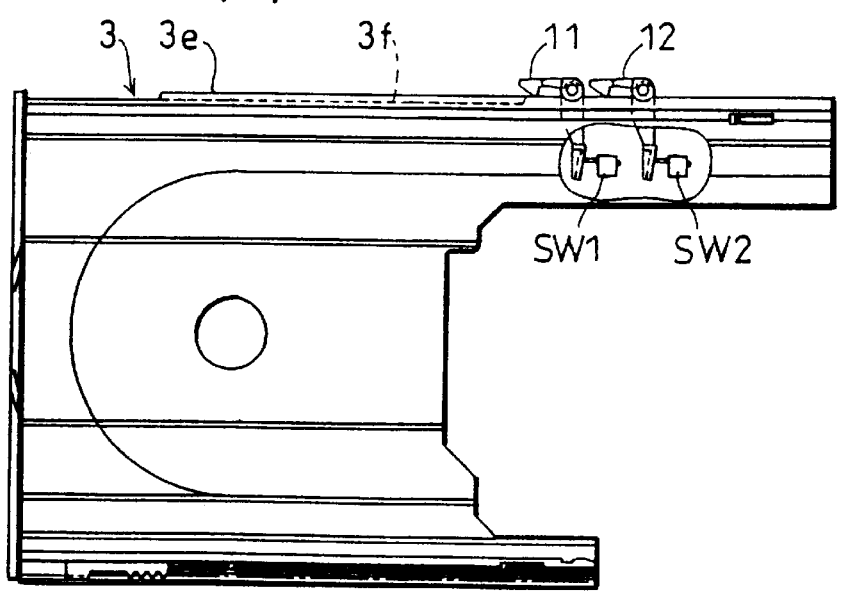

As shown in FIG. 8(a), when the lower tray 3 is in the storage position T2, the switches SW1 and SW2 are both turned on. As shown in FIG. 8(b), when the lower tray 3 is between the loading and unloading position T1 and the storage position T2, the switch SW1 is turned on, and the switch SW2 is turned off. As shown in FIG. 8(c), when the lower tray 3 is in the loading and unloading position T1, the switches SW1 and SW2 are both turned off.

Figure 7A:
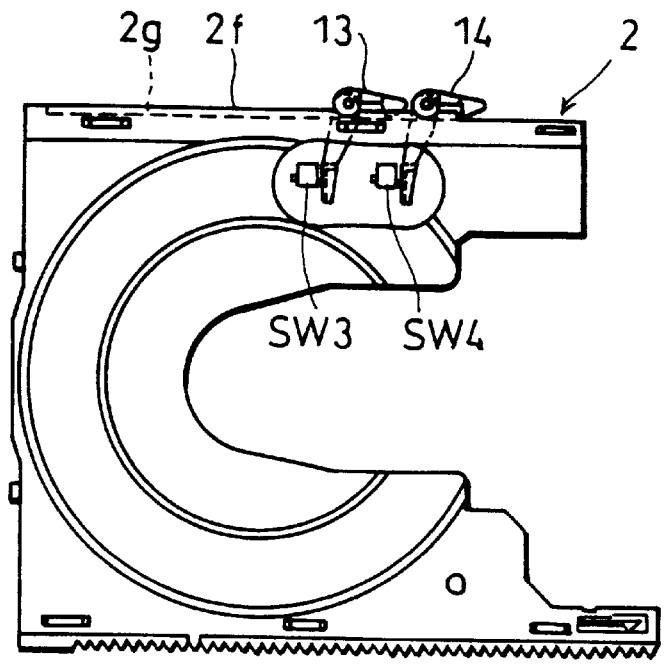
FIGS. 7(a) through 7(c) are plan views showing an ON state and an OFF state of tray position detecting switches in accordance with the position of the upper tray of the disk loading devices of the embodiment and another embodiment in accordance with the present invention.
Figure 7B:
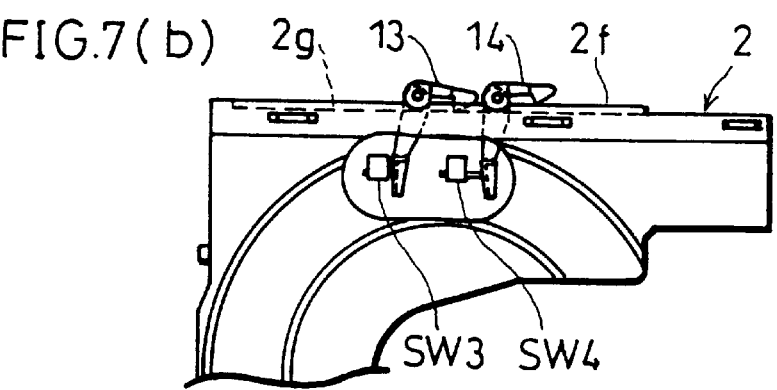
Figure 7C:
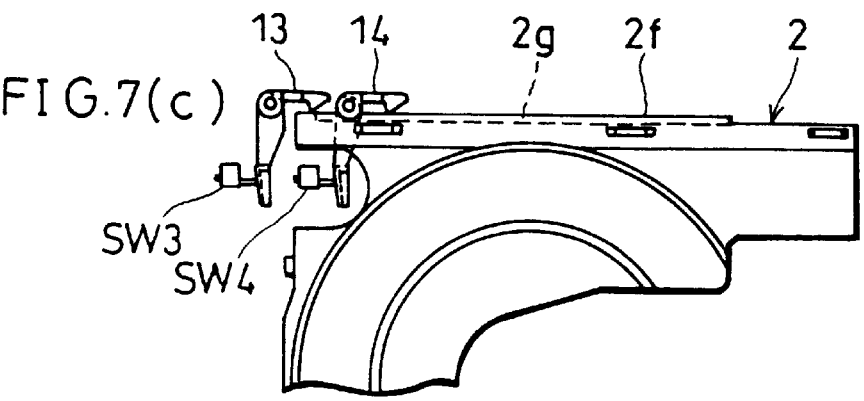

As shown in FIG. 7(a), when the upper tray 2 is in the storage position T2 or outside the storage position T2, the switches SW3 and SW4 are both turned on. As shown in FIG. 7(b), when the upper tray 2 is between the storage position T2 and the reproduction position T3, the switch SW3 is turned on, and the switch SW4 is turned off. As shown in FIG. 7(c), when the upper tray 2 is in the reproduction position T3, the switches SW3 and SW4 are both turned off.

As shown in FIG. 6, the tray driving mechanism 4 as tray driving means is constituted by the two pinions 21 and 22, a pinion pulley 23, a pinion drive belt 24, pressure rollers 25 and 26, gears 27 through 30, a drive pulley 31, a drive belt 32, a pinion rotating motor 33, and a pinion turning mechanism 35. The pinion turning mechanism 35 as pinion turning means is constituted by a base 36, a joint lever 37, and pinion turning cams 41a (will be described later in detail; see FIG. 12).

Although the tray driving mechanism 4 is provided with the pinion pulley 23 and the pinion drive belt 24, two pairs of gears 39 and a pinion gear 40 may be used instead of the pinion pulley 23 and the pinion drive belt 24 as shown in FIG. 2. The pair of gears 39 are driven by pinion gears 40.

The pinions 21 and 22, the pinion pulley 23, and the pressure rollers 25 and 26 are disposed on the base 36 so as to be freely rotatable. The pinions 21 and 22 are moved by the pinion turning mechanism 35 to a position where they engage the rack 2h of the upper tray 2. The pinion pulley 23 is disposed between the pinions 21 and 22, and rotates the pinions 21 and 22 with the pinion drive belt 24. The pressure rollers 25 and 26 press the pinion drive belt 24 onto the pinion pulley 23 on both sides of the pinion pulley 23.

The gear 27 is disposed below the pinion pulley 23 and is coaxially attached to the pinion pulley 23 by a shaft 38 (see FIG. 11). The gear 27 engages the gear 28, the gear 28 engages the gear 29 in turn, and the gear 29 then engages the gear 30. The gear 30 is coaxially attached to the drive pulley 31 by a shaft. The drive belt 32 is wound around the drive pulley 31 and a motor pulley 33a provided coaxially with the pinion rotating motor 33. Such a drive force transmitting mechanism transmits drive force generated by the pinion rotating motor 33 to drive the pinions 21 and 22 and the pinion pulley 23.

The base 36 is supported by the shaft 38 so as to turn freely around the center of rotation of the pinion pulley 23. The base 36 includes a turning edge 36a, and lock claws 36b and 36c. The turning edge 36a is provided on an end closer to the pinion 22. The lock claw 36b is provided between the pressure roller 25 and the pinion 21. The lock claw 36c is provided between the pressure roller 26 and the pinion 22. The lock claws 36b and 36c stick out toward the rack 2h as shown in FIG. 13.

The joint lever 37 is constituted by a main body 37a and a claw section 37b. The main body 37a has a tip of a U-like shape to hold the turning edge 36a in a flanking manner. The claw section 37b, as shown in FIG. 6, has a claw on both ends, and is secured to the main body 37a and supported by the housing 1 so as to turn freely.

The main body 37a, as shown in FIGS. 13 through 15, fluctuates as the claw section 37b contacts the pinion turning cams 41a which have convexities and concavities. The base 36 is turned by the fluctuation of the main body 37a of the joint lever 37. As a result of this movement, three states of the pinions 21 and 22 can be obtained: the states in which either the pinion 21 or 22 engages the rack 2h (the states shown in FIGS. 14 and 15) and the state in which none of the pinions 21 and 22 engages the rack 2h (the state shown in FIG. 13).

As described above, the tray driving mechanism 4 includes the two pinions 21 and 22 for engaging the rack 2h, the pinion pulley 23, disposed between the pinions 21 and 22, for rotating the pinions 21 and 22, the pinion rotating motor 33 for driving and rotating the pinion pulley 23, and the pinion turning mechanism 35 for turning the pinions 21 and 22 around the rotation axis of the pinion pulley 23 so as to locate the pinions 21 and 22 to the positions where the pinions 21 and 22 engage the rack 2h and where they do not.

With the configuration, since the pinions 21 and 22 are turned by the pinion turning mechanism 35, the state in which either of the two pinions 21 and 22 engage the rack 2h can be realized. This makes it possible to switch the direction of the movement of the upper tray 2 without slightly driving the pinion 21 or 22, by changing the pinion 21 or 22 that engages the rack 2h in accordance with the direction of the movement of the upper tray 2.

Consequently, the operation of switching the direction of the movement of the upper tray 2 can be more reliably performed.

As shown in FIG. 2, a main cam 41 of a column-like shape is provided at the back of the housing 1. As the main cam 41 rotates, the reproducing mechanism unit 5, the disk securing mechanism 16 and the pinion turning mechanism 35 work in predetermined manners. The reproducing mechanism unit 5 and the disk securing mechanism 16 are disposed inside the main cam 41.

Figure 9:
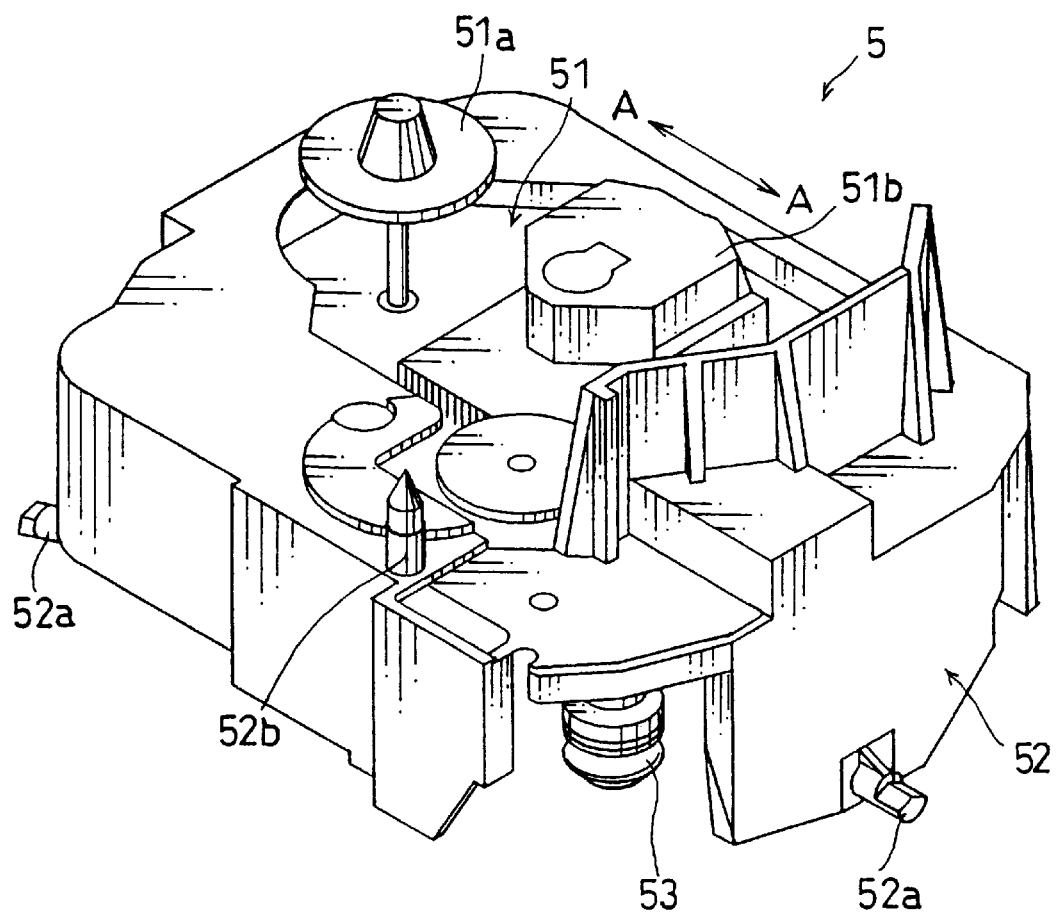
FIG. 9 is a perspective view showing the appearance of a reproducing mechanism unit.

As shown in FIG. 9, the reproducing mechanism unit 5 is constituted by a reproducing mechanism 51, a holder 52 and a damper 53. The holder 52 is a member for covering the reproducing mechanism 51, and is attached to the reproducing mechanism 51 via the damper 53. On the side walls of the holder 52 are provided three driven pins 52a that catch and hold reproducing mechanism elevating and lowering cams 41b (will be described later in detail; see FIG. 6). The driven pins 52a elevate and lower the reproducing mechanism unit 5 as they are elevated and lowered by rotation of the main cam 41.

The holder 52 has on its upper surface a holding protrusion 52b formed so as to stick upward. When the upper tray 2 is in the reproduction position T3, and the reproducing mechanism unit 5 is in a position that allows reproduction of the disk 6 on the upper tray 2, the holding protrusion 52b is caught by the guide hole 2k and thus holds the upper tray 2.

In order to reproduce the information recorded on the disk 6 by rotating the disk 6 in a reproduction position, the reproducing mechanism 51 is constituted by, for instance, the turn table 51a for rotating the disk 6, a spindle motor (not shown) for rotating the turn table 51a, and the pickup 51b for optically reading and writing information on the disk 6. The pickup 51b is provided so as to be freely movable parallel to the straight line indicated by the arrow A—A.

The reproducing mechanism 51 can incorporate not only a reproducing function but a recording function as well.

Figure 10:
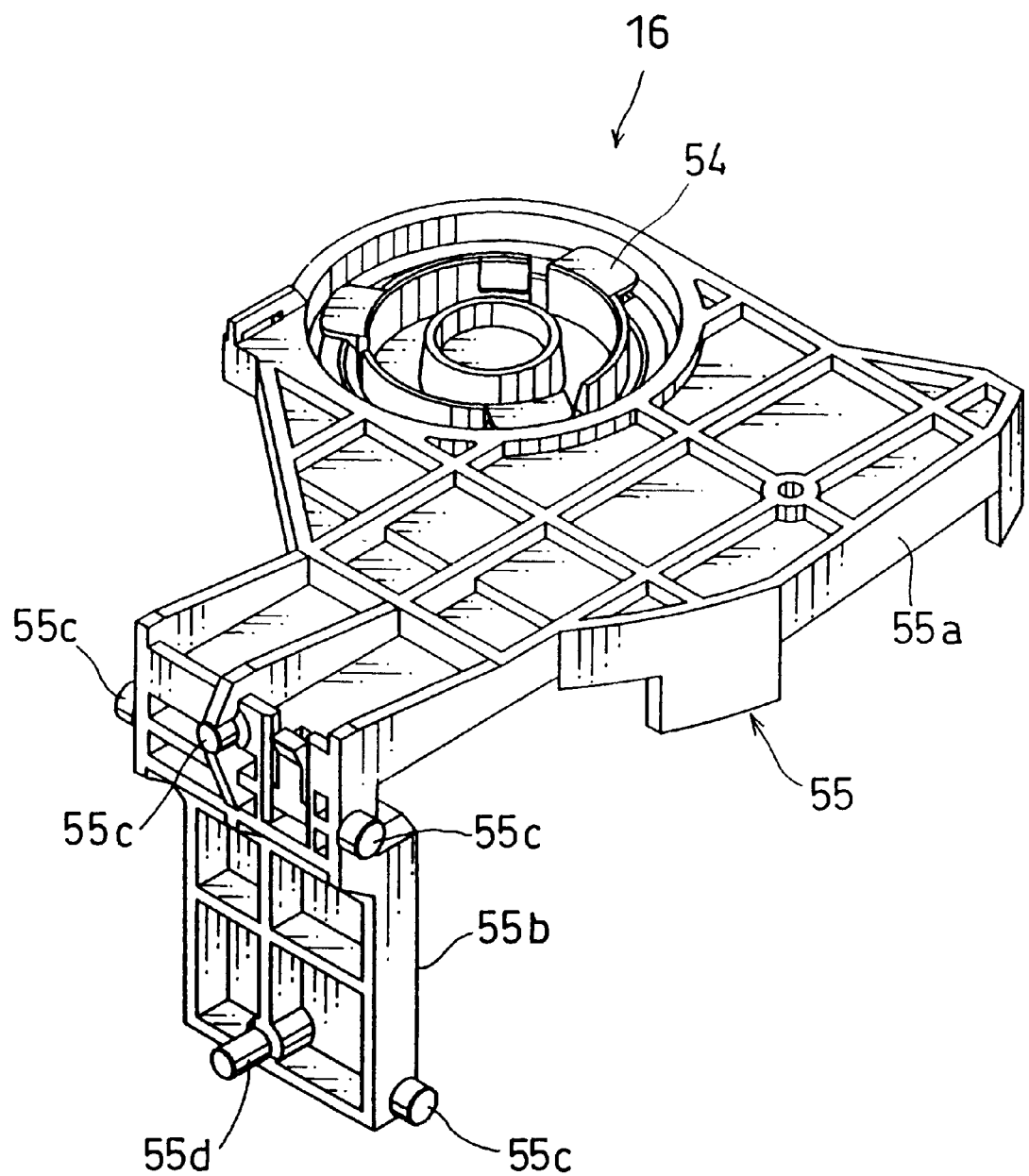
FIG. 10 is a perspective view showing the appearance of a disk securing unit.

The disk securing mechanism 16 is, as shown in FIG. 10, constituted by a stabilizer 54 and a stabilizer holder 55. The stabilizer 54 is held by the stabilizer holder 55 so as to be freely rotatable. The disk 6 mounted on the turn table 51a is secured by the stabilizer 54 so as to be freely rotatable during reproduction.

The stabilizer holder 55 has a horizontal plate 55a for holding the stabilizer 54 and a vertical plate 55b disposed perpendicular to the horizontal plate 55a. The vertical plate 55b is provided on its upper and lower parts with five elevating and lowering guide pins 55c, and on its lower part with a driven pin 55d. When the driven pin 55d fits a securing mechanism elevating and lowering cam 41c (will be described later in detail), and the main cam 41 rotates, the driven pin 55d is elevated or lowered, and thereby elevates or lowers the stabilizer holder 55 together with the stabilizer 54. The elevating and lowering guide pins 55c fit a guide groove (not shown) provided to the housing 1, and thus regulates the elevating and lowering of the stabilizer holder 55 to a fixed direction.

Figure 11:
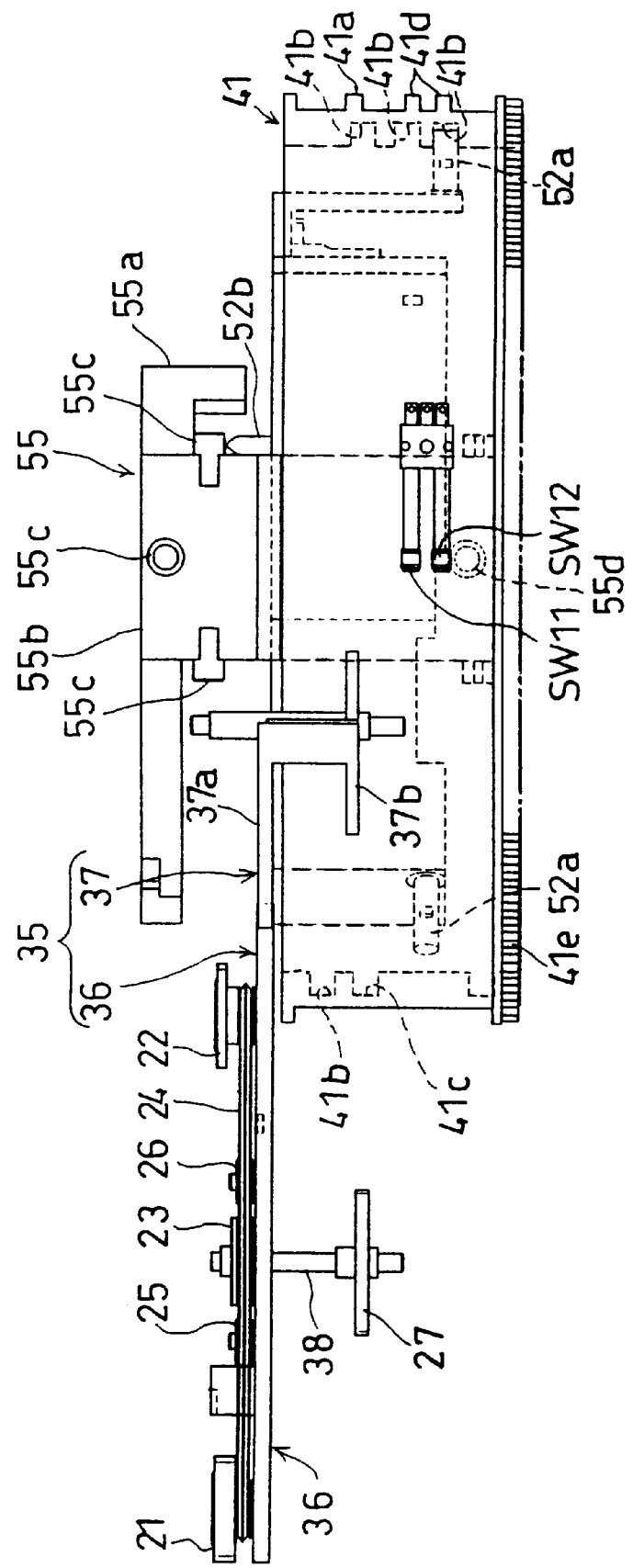
FIG. 11 is a side view showing a configuration of a main cam and components associated with the main cam.
Figure 12:
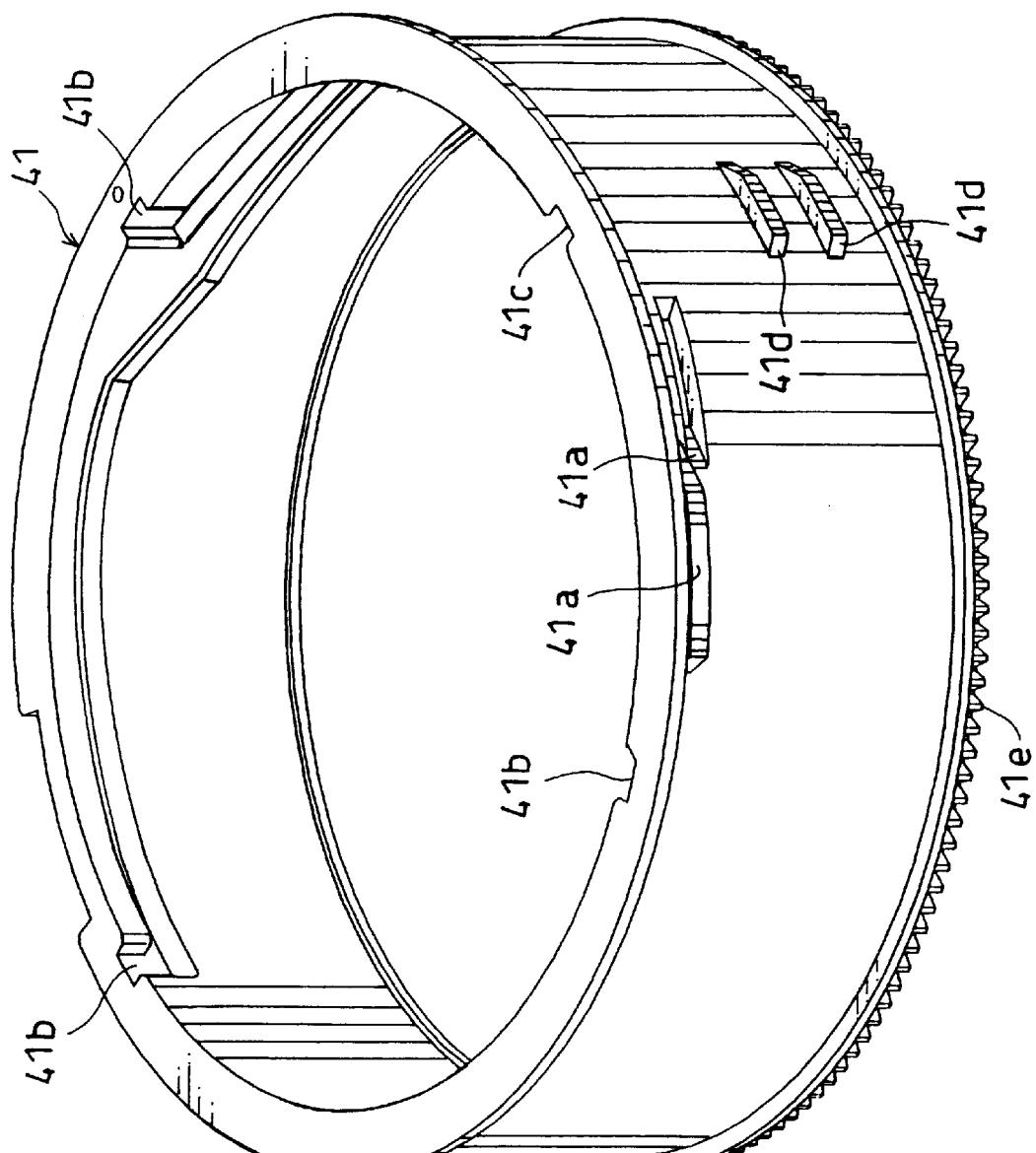
FIG. 12 is a perspective view showing the appearance of the main cam.

As shown in FIGS. 11 and 12, the main cam 41 includes the pinion turning cams 41a, the reproducing mechanism elevating and lowering cams 41b, the securing mechanism elevating and lowering cam 41c, and rotation position detecting cams 41d. The main cam 41 is driven and rotated by a cam driving mechanism 61. The main cam 41 has a gear 41e provided all along the circumference of the bottom surface thereof.

The cam driving mechanism 61 is, as shown in FIG. 6, constituted by gears 62 and 63, a cam rotating pulley 64, a cam rotating belt 65, and a cam rotating motor 66. The gear 62 engages the gear 41e and the gear 63. The gear 63 is coaxially attached to the cam rotating pulley 64 by the shaft 67. The cam rotating belt 65 is wound around the cam rotating pulley 64 and the motor pulley 66a provided coaxially with the cam rotating motor 66. Such a drive force transmitting mechanism transmits drive force generated by the cam rotating motor 66 to drive the main cam 41.

Figure 22:
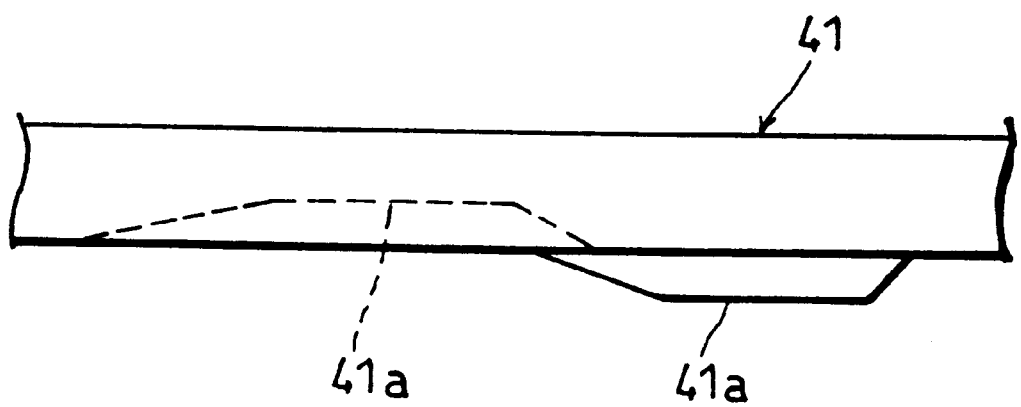
FIGS. 22(a) and 22(b) are plan and front views, respectively, showing a structure of pinion turning cams of the main cam of the disk loading device shown in FIG. 17.
Figure 22:
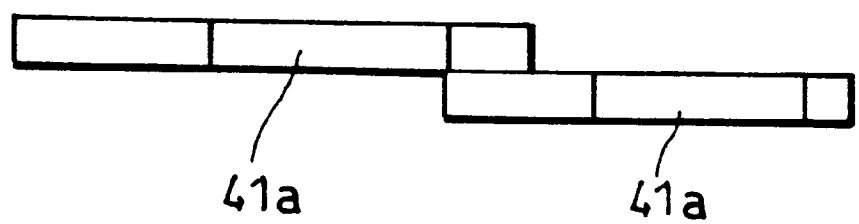

The pinion turning cams 41a are formed in pairs of a convexity and a concavity on an upper part of the outer circumferencial surface of the main cam 41 (see FIGS. 22(a) and 22(b)), whereas the rotation position detecting cams 41d are formed in a convex shape on a lower part of the outer circumferencial surface of the main cam 41. The pinion turning cams 41a are formed at predetermined intervals so as to move the joint lever 37 according to the positions of the upper tray 2 and the lower tray 3. Some of the rotation position detecting cams 41d are arranged in pairs side-by-side at the upper and lower locations as shown in FIG. 12, and the others in singles at one of the two locations with no lower or higher counterpart (not shown). The upper and lower locations correspond to the heights of respective cam position detecting switches (hereinafter will be referred to as switches) SW11 and SW12. The rotation position detecting cams 41d turn on and off the switches SW11 and SW12 in this manner.

The switches SW11 and SW12 are mounted on the housing 1 as shown in FIG. 6, and are provided with a leaf spring on their tips, the leaf springs having contact portions that contact the rotation position detecting cams 41d. The switches SW11 and SW12 are hence turned on when the contact portions touch the rotation position detecting cams 41d and turned off when the contact portions do not touch the rotation position detecting cams 41d. The rotation position of the main cam 41 can be detected on the basis of the four combinations of ON & OFF, OFF & ON, ON & ON, and OFF & OFF of the switches SW11 and SW12 in accordance with the arrangement of the locations of the rotation position detecting cams 41d.

As shown in FIG. 11, the reproducing mechanism elevating and lowering cams 41b are formed as three grooves so as to fulfill the following purposes: the reproducing mechanism elevating and lowering cams 41b should move the three driven pins 52a while fitting the driven pins 52a, and, as the reproducing mechanism elevating and lowering cams 41b rotate, should elevate and lower the reproducing mechanism 51 to predetermined positions for the reproduction and transportation of the disk 6. A part of the reproducing mechanism elevating and lowering cam 41b is formed obliquely so as to elevate and lower the reproducing mechanism unit 5, and the rest is formed horizontally so as not to elevate or lower the reproducing mechanism unit 5. The reproducing mechanism elevating and lowering cams 41b are disposed at intervals corresponding to those of the driven pins 52a so as to always maintain the reproducing mechanism 51 in a horizontal position.

The securing mechanism elevating and lowering cam 41c is formed as a single groove so as to move the stabilizer holder 55 while fitting the driven pin 55d. A part of the securing mechanism elevating and lowering cam 41c is also formed obliquely so as to elevate and lower the stabilizer holder 55, and the rest is formed horizontally so as not to elevate and lower the stabilizer holder 55.

The arrangement of the locations of the pinion turning cams 41a, and the shape of the reproducing mechanism elevating and lowering cams 41b and the securing mechanism elevating and lowering cam 41c are associated with the arrangement of locations of the rotation position detecting cams 41d. For this reason, the locations of the upper tray 2, the lower tray 3, the reproducing mechanism unit 5, and the stabilizer 54 are detected on the basis of the ON and OFF states of the switches SW11 and SW12. Besides since the main cam 41 has the aforementioned four kinds of cams, the upper tray 2, the lower tray 3, the reproducing mechanism 51, and the stabilizer 54 are moved in an associated manner by the rotation of the main cam 41.

As described above, the pinion turning cams 41a are provided integrally with the reproducing mechanism elevating and lowering cams 41b, and formed in such a shape to generate movement that causes the pinions 21 and 22 to be turned when the reproducing mechanism elevating and lowering cams 41b rotate.

Since the pinion turning cams 41a are formed as above, if the movement of the reproducing mechanism elevating and lowering cams 41b is detected, the movement of the pinion turning mechanism 35 can also be detected. The location of the upper tray 2 and the reproducing mechanism 51 can be therefore detected by detecting the movement of the reproducing mechanism elevating and lowering cams 41b alone. This eliminates the need for providing individual devices for detecting the locations of the pinions 21 and 22 and for detecting the location of the reproducing mechanism 51.

As a result, the detecting device can be simpler, and the controls of the loading movement are facilitated.

Next, the following is a description on specific movement, especially, of the tray driving mechanism 4 of the present disk loading device.

Figures 13A, 13B:
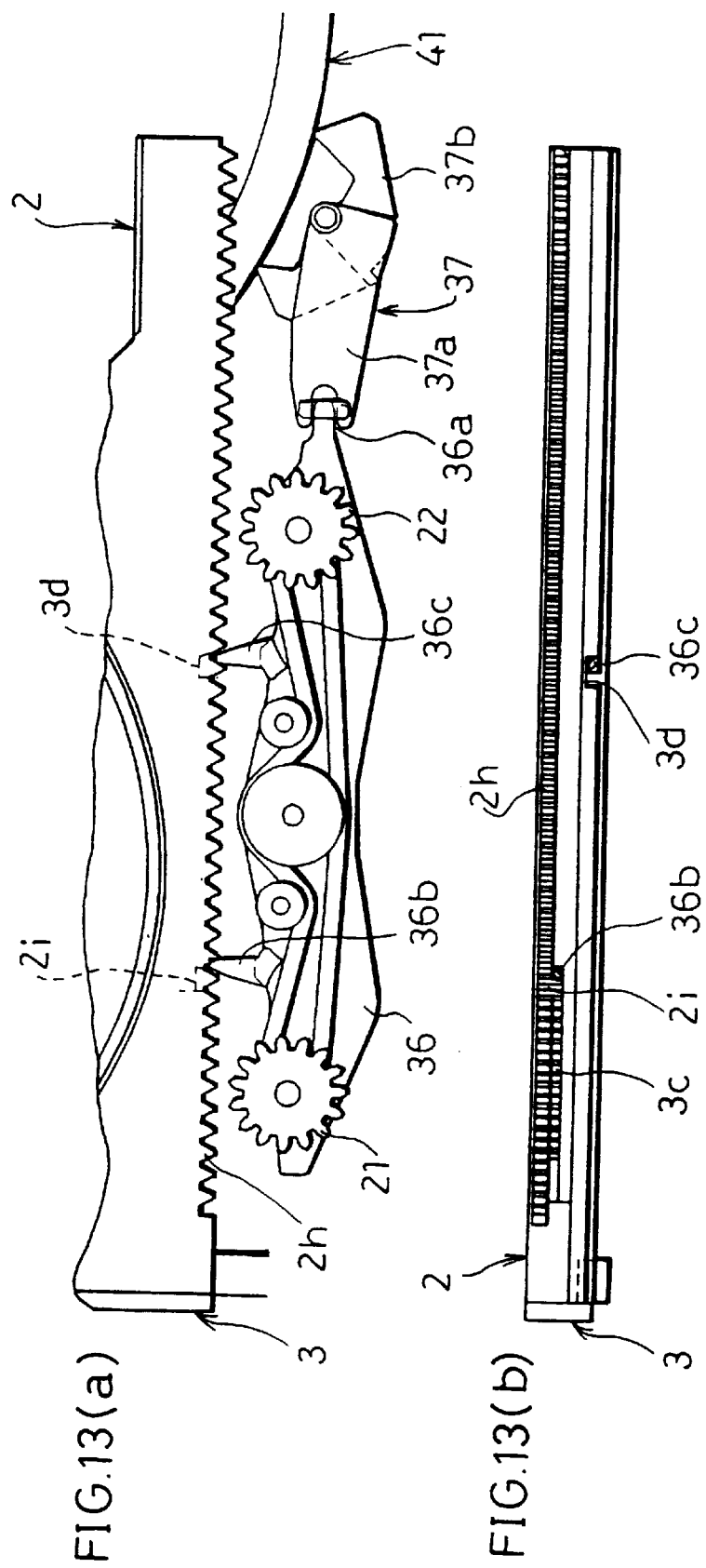
FIGS. 13(a) and 13(b) are a plan view and a side view, respectively, showing the locations of the two pinions when the upper tray is in the storage position.

Referring to FIGS. 13(a) and 13(b), when the upper tray 2 is in the storage position T2, the claw section 37b does not contact any of the pinion turning cams 41a of the main cam 41 with the joint lever 37 being in a neutral state. At this time, since the straight line passing through the centers of the pinions 21 and 22 is almost parallel to the rack 2h, neither of the pinions 21 and 22 engages rack 2h.

Now referring to FIGS. 14(a) and 14(b), when the upper tray 2 moves from the storage position T2 to the loading and unloading position T1, the claw section 37b contacts the concave pinion turning cam 41a and the convex pinion turning cam 41a, and the main body 37a is thereby turned in the direction indicated by the arrow B2 (counterclockwise). As a result, the base 36 is turned in the direction indicated by the arrow C1 (clockwise). The pinion 21 therefore engages the rack 2h, and the drive force generated by the pinion rotating motor 33 is transmitted to the pinion 21 by the drive force transmitting mechanism and the pinion pulley 23. Hence the pinion 21 is rotated, which then moves the upper tray 2 in turn.

Figures 15A, 15B:
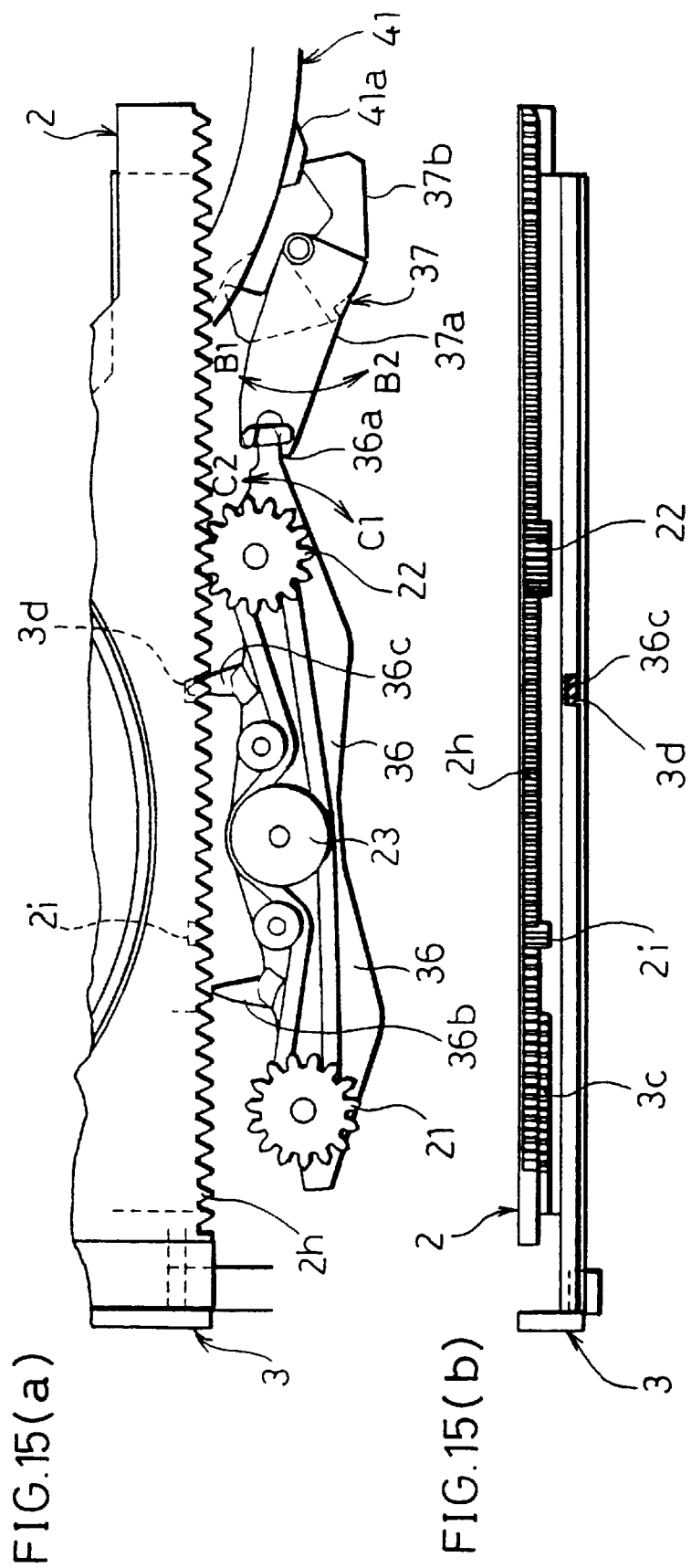
FIGS. 15(a) and 15(b) are a plan view and a side view, respectively, showing the locations of the two pinions when the upper tray is moved from the storage position to the reproduction position.

Referring to FIGS. 15(a) and 15(b), when the upper tray 2 moves from the storage position T2 to the reproduction position T3, the claw section 37b contacts the pinion turning cams 41a similarly as in FIG. 14(a), however, with the positions of the concavity and convexity being reversed. The main body 37a is thereby turned in the direction indicated by the arrow B1 (clockwise). As a result, the base 36 is turned in the direction indicated by the arrow C2 (counterclockwise). The pinion 22 therefore engages the rack 2h, and the drive force generated by the pinion rotating motor 33 is transmitted to the pinion 22 in the same manner as during rotation of the pinion 21. Hence the pinion 22 is rotated, which then moves the upper tray 2 in turn.

Besides, when upper tray 2 moves from the storage position T2 to the reproduction position T3, the upper tray 2 does not hold the lower tray 3, thus allowing the lower tray 3 to move freely. However, the base 36 is turned in the direction indicated by the arrow C2, and the lock claw 36c hence engages the notch 3d. The lower tray 3 is thereby kept in the storage position T2 and cannot move.

The lock claw 36c is turned by the pinion turning mechanism 35 together with the pinions 21 and 22 so that the lower tray 3 does not move while neither of the pinions 21 and 22 is in engagement with the rack 2h and while either the pinion 21 or 22 is in engagement with the rack 2h and moves the upper tray 2 between the storage position T2 and the reproduction position T3.

When the direction of the movement of the upper tray 2 in the storage position T2 is switched towards the loading and unloading position T1 or the reproduction position T3, none of the pinions 21 and 22 engages the rack 2h, allowing the lower tray 3 to move freely. The lower tray 3 is also allowed to move freely when the upper tray 2 is in the reproduction position T3 or between the storage position T2 and the reproduction position T3. To avoid this possible inconvenience, the above configuration includes the notch 3d that prevents the lower tray 3 from moving, thus eliminating the need to provide a separate holding mechanism for holding the lower tray 3 so as not to move and to form the lower tray 3 to be strong enough to be held by such a holding mechanism.

In addition, the lock claw 36c is turned together with the pinions 21 and 22. Therefore, if the lock claw 36c is configured to be separated from the lower tray 3 when the upper tray 2 is moved with the lower tray 3 between the storage position T2 and the loading and unloading position T1, the lower tray 3 can be selectively prevented from moving in accordance with the turning state of the pinions 21 and 22.

This makes it possible to avoid undesirable movement of the lower tray 3 and realize reliable and smooth movement of the lower tray 3, with a simple configuration.

When the upper tray 2 moves from the storage position T2 to the loading and unloading position T1 or the reproduction position T3, none of the pinions 21 and 22 on the base 36 engages the rack 2h as shown in FIGS. 13(a) and 13(b) for a short period of time. When the upper tray 2 moves to the loading and unloading position T1 from this state, contrary to the previous case, the base 36 turns to the position shown in FIGS. 14(a) and 14(b), and the lock claw 36c releases the notch 3d, so that the lower tray 3 can move together with the upper tray 2.

When the upper tray 2 is in the storage position T2, and none of the pinions 21 and 22 engages the rack 2h, the upper tray 2 can move freely. However, the lock claw 36b collides with the collide-and-hold section 2i as shown in FIGS. 13(a) and 13(b), holding the upper tray 2 so as not to move to the reproduction position T3 freely. The collision of the collide-and-hold section 2i with the partial rack 3c holds the upper tray 2 so as not move to the loading and unloading position T1 as well.

The tray driving mechanism 4 is provided with the lock claw 36b that is turned together with the pinions 21 and 22 by the pinion turning mechanism 35 so that the upper tray 2 is prevented from moving when none of the pinions 21 and 22 engages the rack 2h.

With the above configuration, the lock claw 36b prevents the upper tray 2 from moving, thus eliminating the need to provide a separate holding mechanism for holding the upper tray 2 so as not to move when none of the pinions 21 and 22 engages the rack 2h. In addition, the lock claw 36b is turned together with the pinions 21 and 22. Therefore, if the lock claw 36b is configured to be separated from the upper tray 2 when the upper tray 2 is driven by the pinions 21 and 22, the upper tray 2 can be selectively prevented from moving in accordance with the turning state of the pinions 21 and 22.

This makes it possible to avoid undesirable movement of the upper tray 2 with a simple configuration.

Referring to FIGS. 16(a) and 16(b), the stopper 2j catches and holds the protrusion section 8a, the upper tray 2 holds the lower tray 3 in the loading and unloading position T1. Therefore, if the upper tray 2 is moved towards the reproduction position T3, the lower tray 3 is about to be moved together. To avoid this possible inconvenience, a hold releasing cam 1b (hold releasing means) for releasing the hold by the lock lever 8 is provided on the housing 1 beneath the rack 2h.

Accordingly, as shown in FIGS. 16(c) and 16(d), when the lower tray 3 is in a release starting position right before reaching the storage position T2 from the loading and unloading position T1, the lock lever 8 starts to contact the hold releasing cam 1b. As the upper tray 2 and the lower tray 3 reach the storage position T2, as shown in FIGS. 16(e) and 16(f), the lock lever 8 is pushed by the hold releasing cam 1b and turned in the direction indicated by the arrow D1 against the pressing force of the spring 9 as a result of movement of the upper tray 2. Consequently the lock lever 8 is completely released.

If the protrusion section 8a is released from the stopper 2j when the upper tray 2 and the lower tray 3 reach the storage position T2 to completely release the hold in the storage position T2, it is impossible to smoothly proceed to next movement. Therefore, the protrusion section 8a is configured to be released from the stopper 2j during the transient period between the state shown in FIG. 16(c) and the state shown in FIG. 16(e). However, this configuration causes the lower tray 3 to be released and left behind right before reaching the storage position T2.

To avoid this possible inconvenience, the present disk loading device preferably includes the partial rack 3c for engaging the pinion 21 together with the rack 2h about where the lock lever 8 holds the lower tray 3 onto the upper tray 2. So, the present disk loading device is configured to let the partial rack 3c as well as the rack 2h engage pinion 21 only between the release starting position and the storage position T2.

With the above configuration, when the pinion 21 engages and rotates with the rack 2h to move the upper tray 2, as the lower tray 3 reaches a neighborhood of the position where the lower tray 3 is held by the upper tray 2 (release starting position), the pinion 21 also engages the partial rack 3c. The pinion 21 therefore drives and moves both the lower tray 3 and the upper tray 2 to the holding positions. Therefore, the upper tray 2 is prevented from starting to move immediately before the lower tray 3 is held by the lock lever 8 onto the upper tray 2, and the lower tray 3 is prevented from being displaced while the upper tray 2 is being moved.

The inconvenience is avoided by the pinion 21 driving the lower tray 3 in sections where the lock lever 8 does not firmly hold the lower tray 3. Such a structure also allows the hold of the lower tray 3 to be easily released by movement of the lock lever 8, and enables the upper tray 2 and the lower tray 3 to complete the required movement. In addition, the structural arrangement described so far enables the upper tray 2 and the lower tray 3 to be moved as desired among the positions T1, T2 and T3.

Once the lower tray 3 is held onto the upper tray 2, the lower tray 3 is not necessarily driven by the partial rack 3c. So, the partial rack 3c formed far shorter than the rack 2h can still serve the purpose. Therefore, it is unnecessary to form as long a rack on the lower tray 3 as on the upper tray 2, and to reduce the increases in manufacturing costs of the lower tray 3.

This makes it possible to hold the lower tray 3 onto the upper tray 2 with an inexpensive configuration.

Note that the lock lever 8 is turned in the direction indicated by the arrow D2 by the pressure force of the spring 9 to hold the lower tray 3.

The disk 6 mounted on the upper tray 2 should be prevented from touching the turn table 51a when the upper tray 2 is moved between the storage position T2 and the reproduction position T3. For this purpose, the reproducing mechanism unit 5 is disposed to be perpendicularly separated by the reproducing mechanism elevating and lowering cams 41b from the movement area of the upper tray 2 until the upper tray 2 reaches the reproduction position T3. Then after the upper tray 2 reaches the reproduction position T3, the reproducing mechanism unit 5 is elevated by rotation of the reproducing mechanism elevating and lowering cam 41b, and the turn table 51a scoops up the disk 6 on the upper tray 2. In this manner, the disk 6 can be reproduced while being mounted on the turn table 3a.

When the upper tray 2 is not in the reproduction position T3, the stabilizer 54 is disposed above the turn table 51a. After the upper tray 2 reaches the reproduction position T3 and the turn table 51a scoops up the disk 6, the stabilizer 54 is moved toward the turn table 51a by the securing mechanism elevating and lowering cam 41c. Consequently, the disk 6 is pressed to the turn table 51a by the stabilizer 54 and secured to be freely rotatable.

The present disk loading device adopts the following configuration in order to execute this movement: (1) The securing mechanism elevating and lowering cam 41c is provided integrally with the reproducing mechanism elevating and lowering cams 41b so as to elevate and lower the stabilizer 54 according to rotation of the reproducing mechanism elevating and lowering cams 41b that are restricted in movement by the housing 1 to move along the central axis of the disk 6. (2) The reproducing mechanism unit 5 moves along the central axis of the disk 6 when being elevated and lowered according to rotation of the reproducing mechanism elevating and lowering cams 41b, and contacts the reproducing mechanism elevating and lowering cams 41b so as to maintain the horizontal posture thereof when the reproducing mechanism unit 5 is elevated and lowered and when the reproducing mechanism unit 5 sits still.

With the above configuration, the reproducing mechanism unit 5 is elevated and lowered along the central axis of the disk 6 according to rotation of the reproducing mechanism elevating and lowering cams 41b, while maintaining the horizontal posture thereof. Meanwhile, the stabilizer 54 is elevated and lowered by the rotation of the securing mechanism elevating and lowering cam 41c disposed, together with the reproducing mechanism elevating and lowering cams 41b, on the inner circumferencial surface of the main cam 41. Therefore, the reproducing mechanism unit 5 and the stabilizer 54 are both elevated and lowered by the rotation of the main cam 41 having the reproducing mechanism elevating and lowering cams 41b and the securing mechanism elevating and lowering cam 41c.

When the upper tray 2 has moved to the reproduction position, at least the reproducing mechanism unit 5 needs to retreat downward so as not to contact the upper tray 2. The relative positions of the reproducing mechanism unit 5 and the stabilizer 54 can be maintained correctly for such movement as well, since the reproducing mechanism elevating and lowering cams 41b and the securing mechanism elevating and lowering cam 41c are moved integrally. Besides, since the stabilizer 54 is restricted in movement by the housing 1 to move along the central axis of the disk 6, the disk 6 can be firmly secured.

Consequently, the disk 6 can be stably and reliably transported and secured.

Figure 1B:
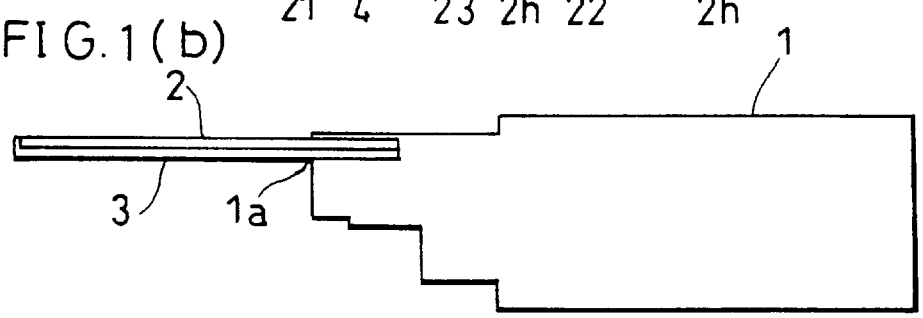
FIGS. 1(b) through 1(d) are side views showing the movements between the three positions of the upper tray and the lower tray.
Figure 1C:
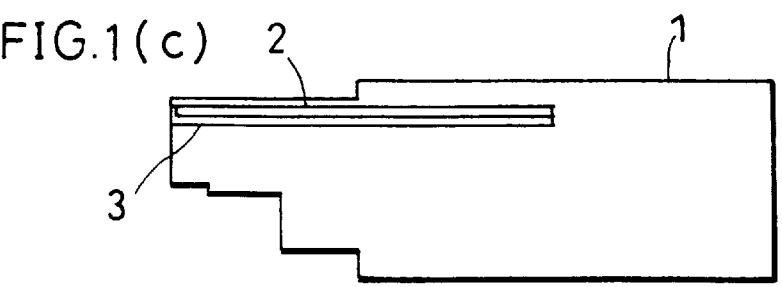
Figure 1D:
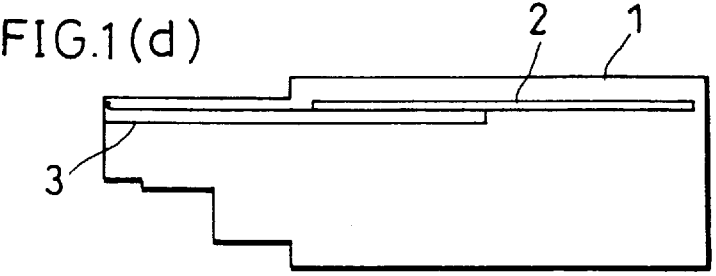

With the configuration, since the upper tray 2 is held onto the lower tray 3 by the lock lever 8 between the loading and unloading position T1 shown in FIG. 1(b) and the storage position T2 shown in FIG. 1(c), the tray assembly 10 can be provided with enough strength to carry and move the disk 6 outside the housing 1. Besides, since the hold by the lock lever 8 is released in the storage position T2, only the upper tray 2 can be moved to the reproduction position T3 shown in FIG. 1(d).

The present disk loading device is such that the tray assembly 10, the reproducing mechanism unit 5 and the stabilizer 54 are moved by rotation of the main cam 41. This makes it possible to, for instance, relate the movement of the reproducing mechanism unit 5 to the switching operation for moving only the upper tray 2, to reduce the number of components, and to facilitate the controls. In addition, the upper tray 2 and the lower tray 3 can be surely operated, since the upper tray 2 and the lower tray 3 are held by the lock claws 36b and 36c as necessary.

Referring to FIGS. 7, 8 and 17 through 26, the following description will discuss another embodiment of the present invention. Here, for convenience, members of the second embodiment that have the same arrangement and function as members of the first embodiment, and that are mentioned in the first embodiment are indicated by the same reference numerals and description thereof is omitted.

The second embodiment will explain a disk loading device using the mechanism laid out in the first embodiment and having additional features of storing a plurality of disks 6 and allowing one of the disks 6 to be replaced while another is being reproduced.

For convenience of description, three tray assemblies 10 will be taken as an example in the following. The tray assemblies 10 can store the disk(s) 6 and the disk(s) 7 at the same time.

Figure 17:
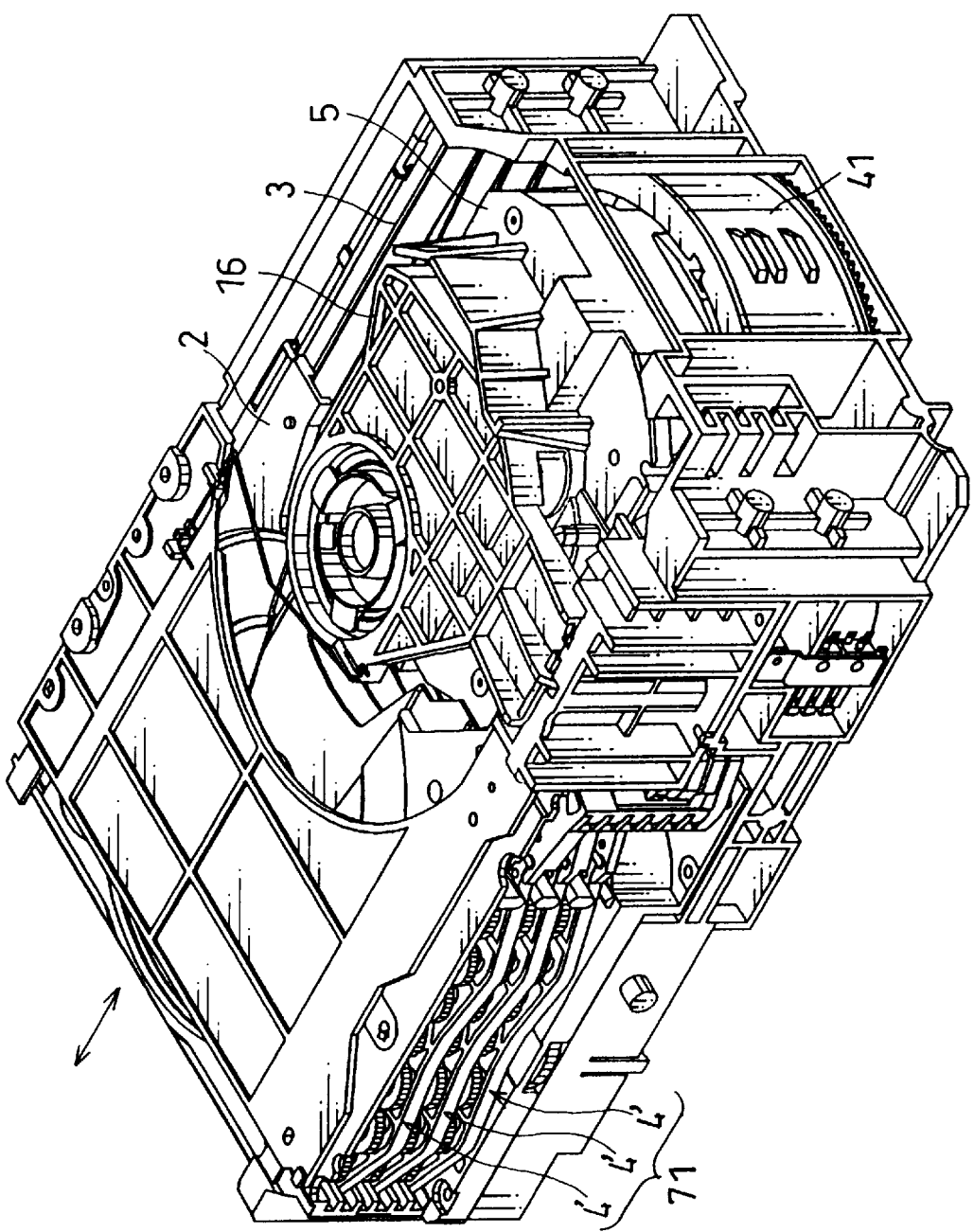
FIG. 17 is a perspective view showing the appearance of a disk loading device of another embodiment in accordance with the present invention.
Figure 18:
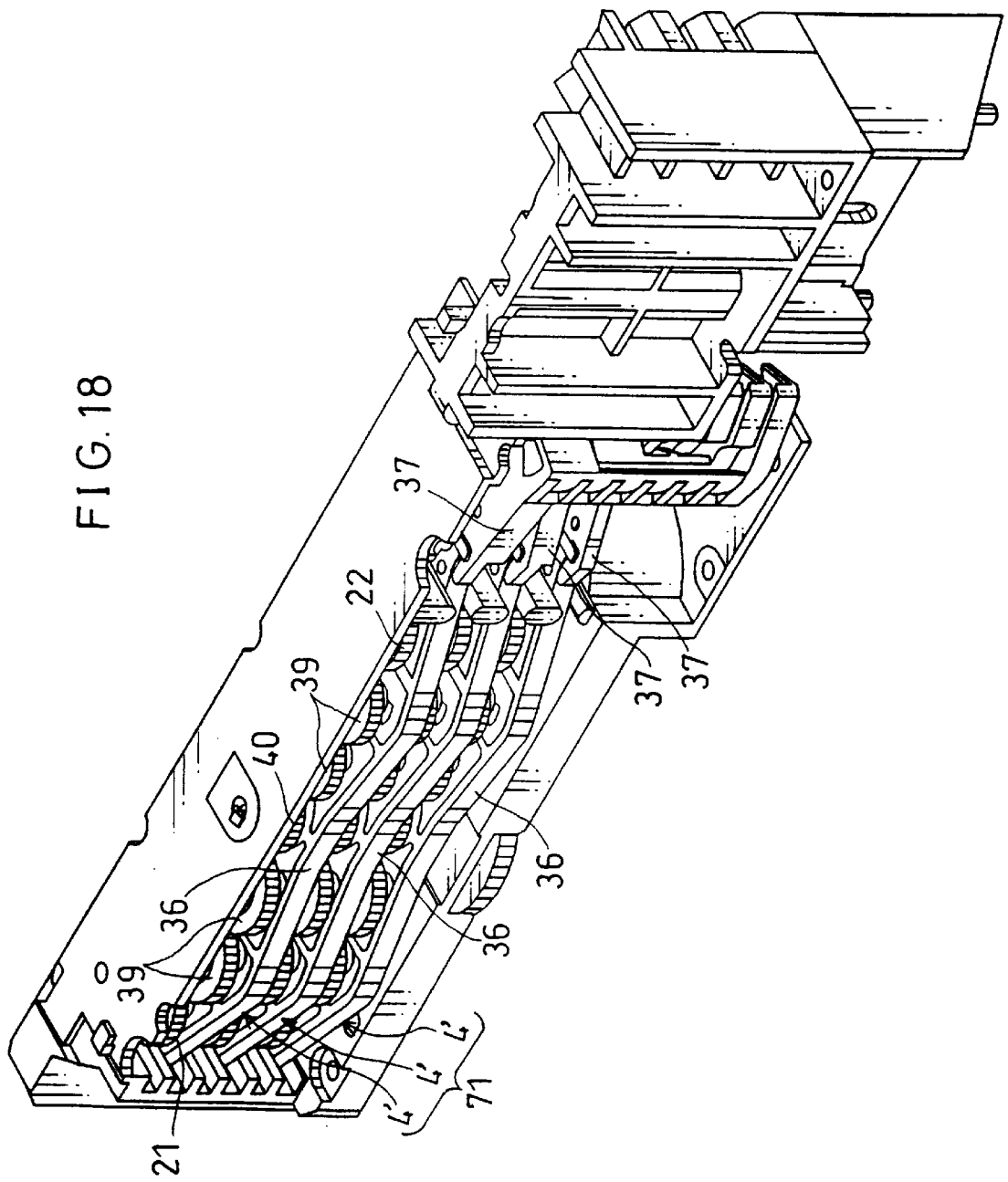
FIG. 18 is a perspective view showing the appearance of a driving unit of the disk loading device shown in FIG. 17.

The disk loading device of the present embodiment includes a driving unit 71 constituted by three tray driving mechanisms 4' stacked on one another as shown in FIGS. 17 and 18. The driving unit 71 operates so that the upper trays 2 of the tray assemblies 10 are moved individually.

The tray driving mechanism 4' of the driving unit 71 is configured to transmit the drive force from the pinion gear 40 to the pinions 21 and 22 via two pairs of gears 39. Similarly to the tray driving mechanism 4 laid out in the first embodiment, the tray driving mechanism 4' may include the pinion pulley 23 and the pinion drive belt 24 as shown in FIG. 6 instead of the pairs of gears 39.

Figure 19:
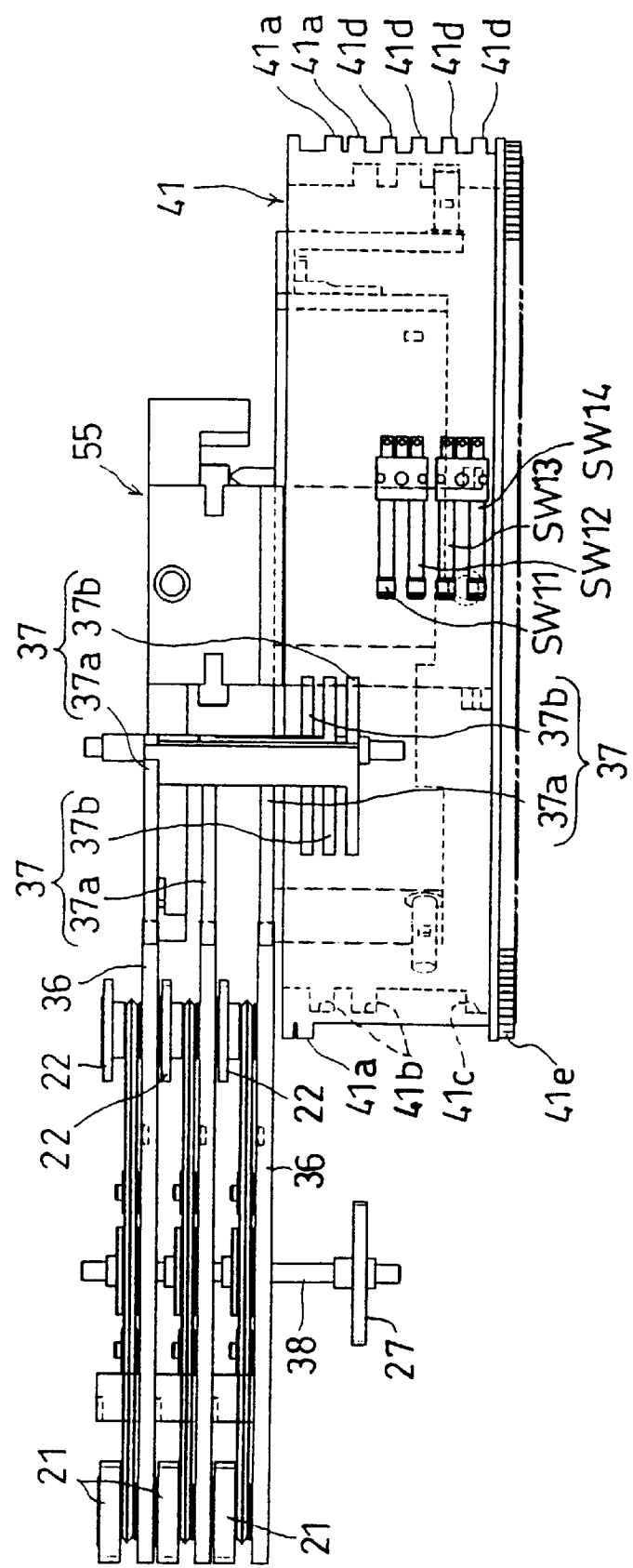
FIG. 19 is a side view showing a configuration of a main cam and components associated with the main cam of the disk loading device shown in FIG. 17.

As shown in FIG. 19, with the driving unit 71, the main bodies 37a of the joint levers 37 are disposed at the same height as the respective bases 36 so as to be connected thereto. The claw section 37b which moves in conjunction with the main body 37a on the top shelf is provided on the bottom shelf. The claw section 37b which moves in conjunction with the main body 37a on the middle shelf is provided on the middle shelf. The claw section 37b which moves in conjunction with the main body 37a on the bottom shelf is provided on the top shelf. The joint levers 37 have different shapes, but have the same function in this manner.

Figure 20A:
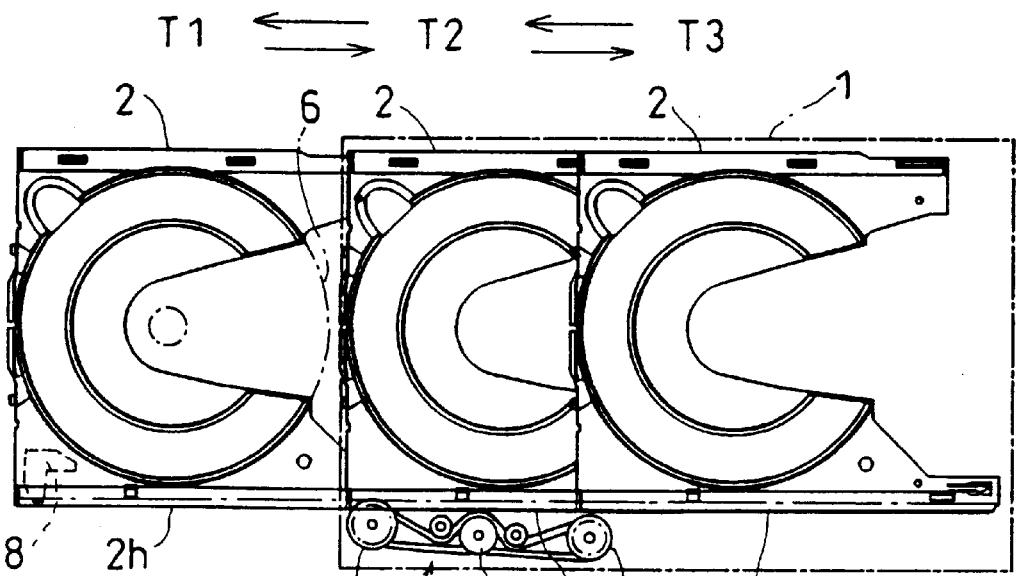
FIG. 20(a) is a plan view showing movements between three positions of an upper tray and a lower tray of the disk loading device shown in FIG. 17.
Figure 20B:
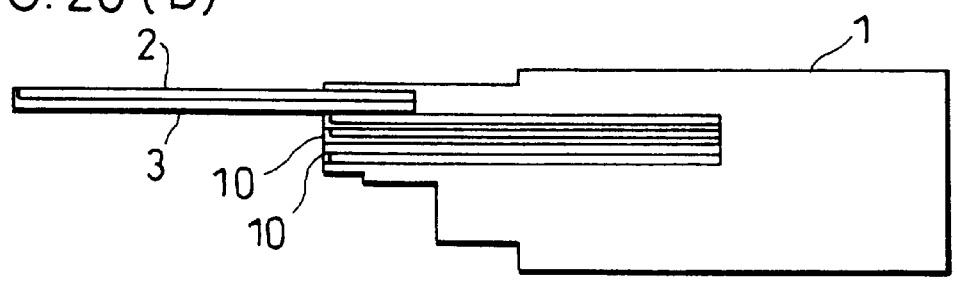
FIGS. 20(b) through 20(d) are side views showing the movements between the three positions of the upper tray and the lower tray.
Figure 20C:
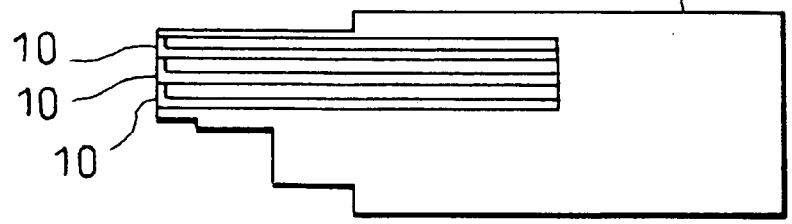
Figure 20D:
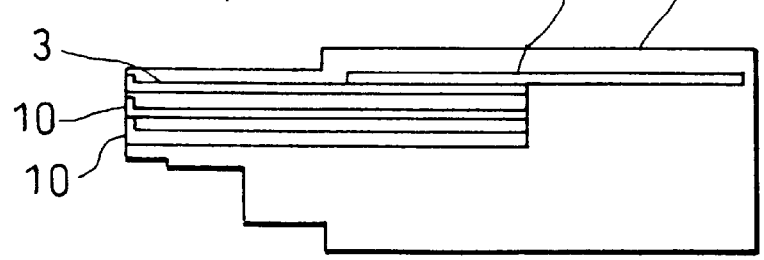

The disk loading device includes the three tray assemblies 10 to accommodate three disks 6 as shown in FIG. 20(c). The tray assemblies 10 on the middle shelf and on the bottom shelf are in the storage position T2 as shown in FIGS. 20(b) through 20(d) in order to unload, load, or replace the disks 6, for example, when the tray assembly 10 on the top shelf, as shown in FIG. 20(a), moves from the loading and unloading position T1 via the storage position T2 to the reproduction position T3.

FIGS. 21(a) and 21(b) are development drawings showing, respectively, the outer and inner circumferencial surfaces of the main cam 41 that is projected and stretched like a narrow band with point O in the middle. As shown in FIGS. 21(a), 21(b) and 19, the main cam 41 of the disk loading device includes the pinion turning cams 41a, the reproducing mechanism elevating and lowering cams 41b, the securing mechanism elevating and lowering cam 41c, and the rotation position detecting cams 41d for each of the three tray assemblies 10.

Specifically, the pinion turning cams 41a are arranged in three rows, and the rotation position detecting cams 41d are arranged in four rows. The pinion turning cams 41a are configured so as to allow selection of engagement states of the pinions 21 and 22 in accordance with rotation positions P1 through P13 (will be described later in detail; see FIG. 25). The pinion turning cams 41a are arranged in pairs of a convexity and a concavity side-by-side at the upper and lower locations as shown in FIGS. 22(a) and 22(b).

The pinion turning cams 41a and the rotation position detecting cams 41d correspond to the rotation positions P1 through P13 of the main cam 41 in the sequence from left to right of FIG. 21(a). The cams at the extreme right of FIG. 21(a) are auxiliary cams 41f for detecting that the main cam 41 has completed one rotation. When it is detected by the auxiliary cams 41f that the main cam 41 has completed one rotation, the main cam 41 is driven to rotate in the opposite direction.

Figure 24:
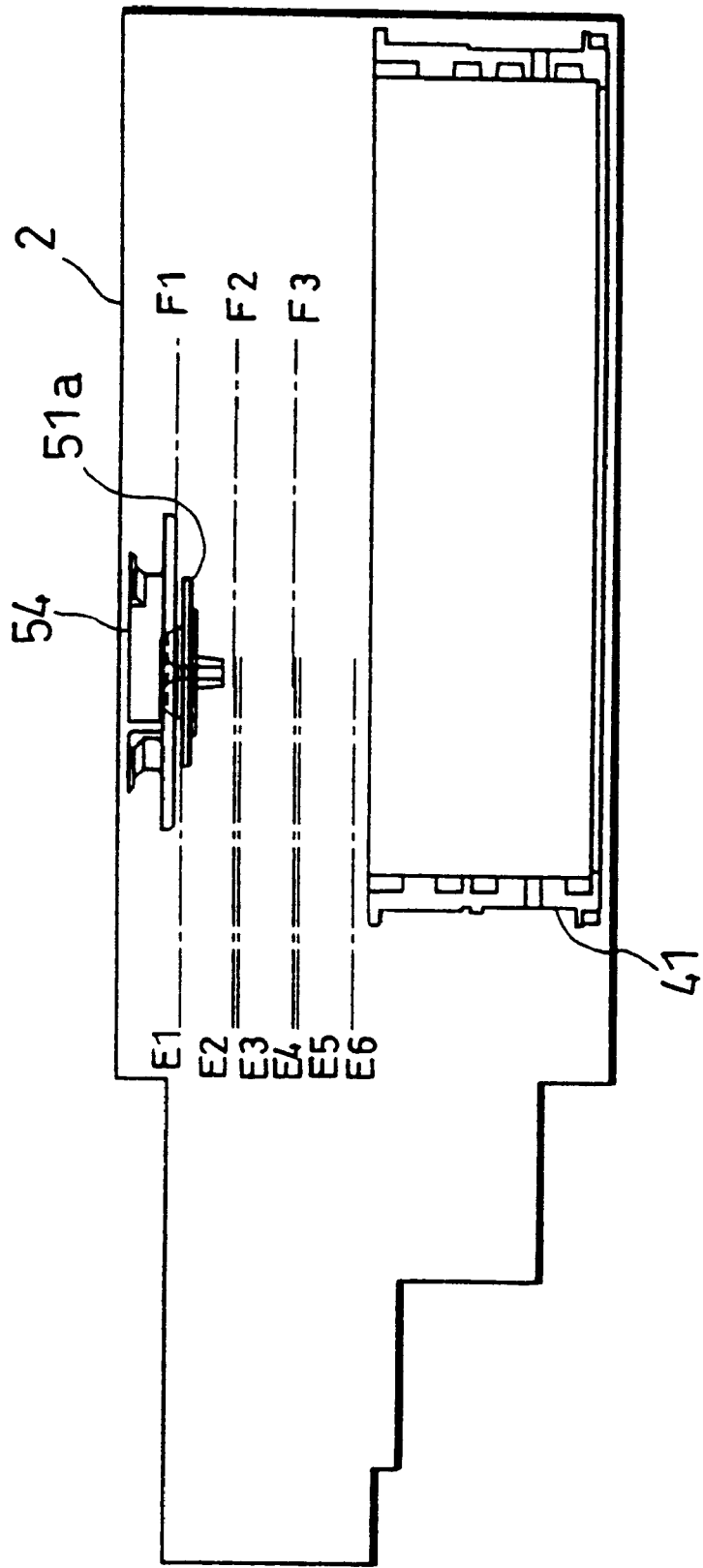
FIG. 24 is an explanatory drawing showing the positions of a turn table and a stabilizer of the disk loading device shown in FIG. 17.
Figure 25:
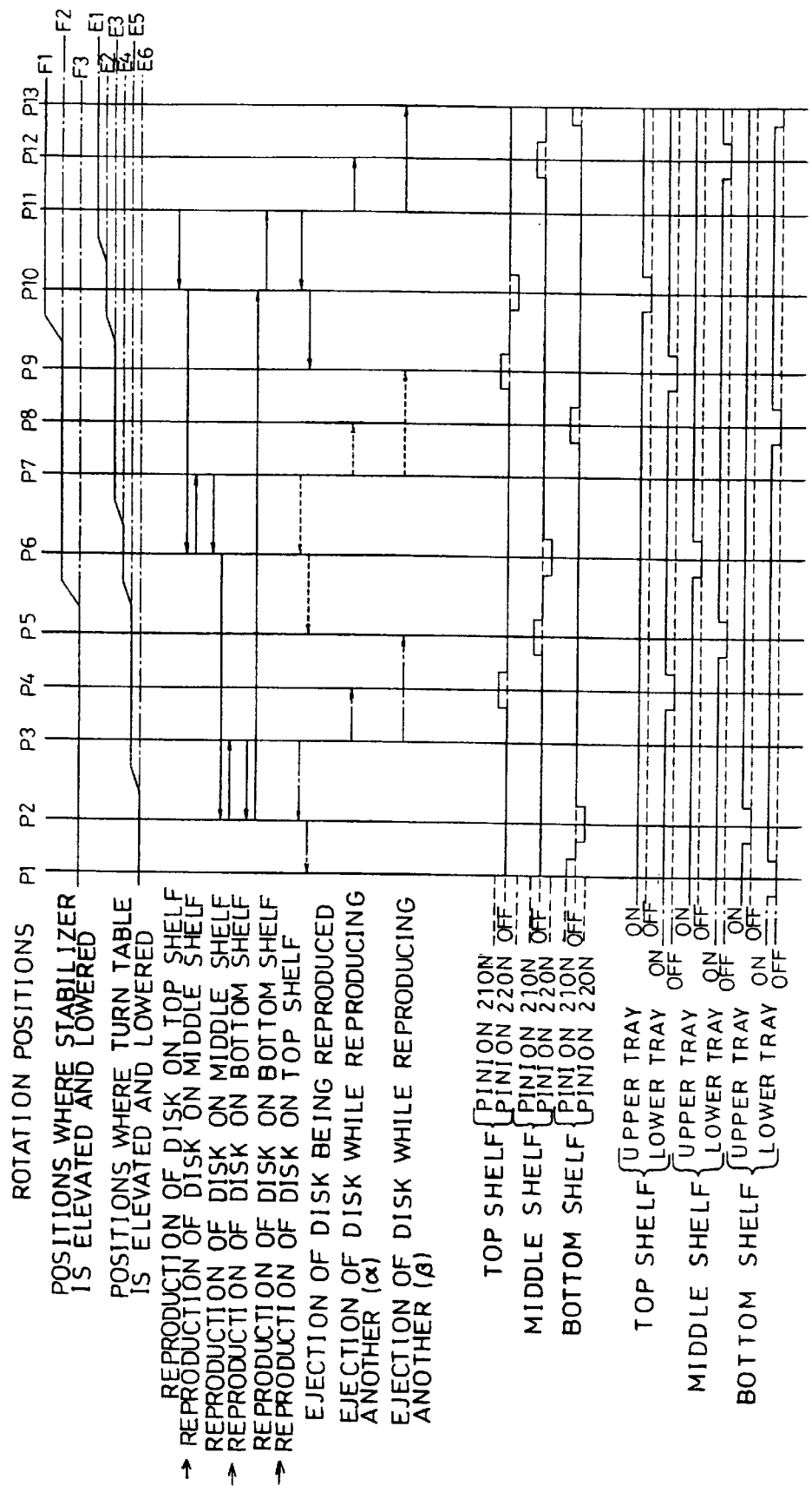
FIG. 25 is a state transient drawing showing transitions of operation states of various sections corresponding to the rotation positions of the main cam of the disk loading device shown in FIG. 17.

The reproducing mechanism elevating and lowering cams 41b and the securing mechanism elevating and lowering cam 41c are configured in such shapes to elevate and lower the turn table 51a and the stabilizer 54 to positions in accordance with the conditions of the upper tray 2 and the lower tray 3 of the tray assembly 10 (see FIGS. 24 and 25).

The reproducing mechanism elevating and lowering cam 41b includes a slope segment $41b_1$ formed obliquely so as to elevate and lower the reproducing mechanism unit 5, and a horizontal segment $41b_2$ formed horizontally so as not to elevate or lower the reproducing mechanism unit 5. The securing mechanism elevating and lowering cam 41c includes a slope segment $41c_1$ formed obliquely so as to elevate and lower the disk securing mechanism 16, and a horizontal segment $41c_2$ formed horizontally so as not to elevate or lower the disk securing mechanism 16. Those segments of the reproducing mechanism elevating and lowering cam 41b and the securing mechanism elevating and lowering cam 41c correspond to the rotation positions P1 through P13 of the main cam 41 as shown in FIG. 21(c).

In this manner, with the disk loading device having a housing 1 encasing a plurality of vertically stacked pairs of upper and lower trays 2 and 3, the reproducing mechanism elevating and lowering cam 41b has the horizontally formed horizontal segment $41b_2$ so as to maintain the reproducing mechanism unit 5 at the constant height.

With the above configuration, the reproducing mechanism unit 5 is prevented by the horizontal segment $41b_2$ from being elevated or lowered when the reproducing mechanism elevating and lowering cam 41b rotates. Therefore it is possible to transport the upper tray 2 without elevating or lowering the reproducing mechanism unit 5 when the pinion turning cams 41a turn the pinions 21 and 22 in response to the rotation of the reproducing mechanism elevating and lowering cam 41b. Therefore it is possible to move one of the upper trays 2 between the storage position T2 and the loading and unloading position T1, while another of the upper trays 2 is being used to reproduce one of the disks 6 which has been transported to the reproduction position T3. In other words, it is possible to eject one of the disks 6 while reproducing another of the disks 6.

Consequently, it is possible to quickly load and unload one of the disks 6 without affecting the reproduction of another of the disks 6.

As shown in FIG. 19, the disk loading device is provided with cam position detecting switches (hereinafter will be referred to as switches) SW11 through SW14 operated by the rotation position detecting cams 41d. The switches SW11 through SW14 are turned on and off depending whether or not they touch the respective rotation position detecting cams 41d. Therefore, it is possible to distinguish the fourteen rotation positions of the main cam 41 (will be explained later in detail) by the combination of ONs and OFFs of the switches SW11 through SW14.

Figure 23:
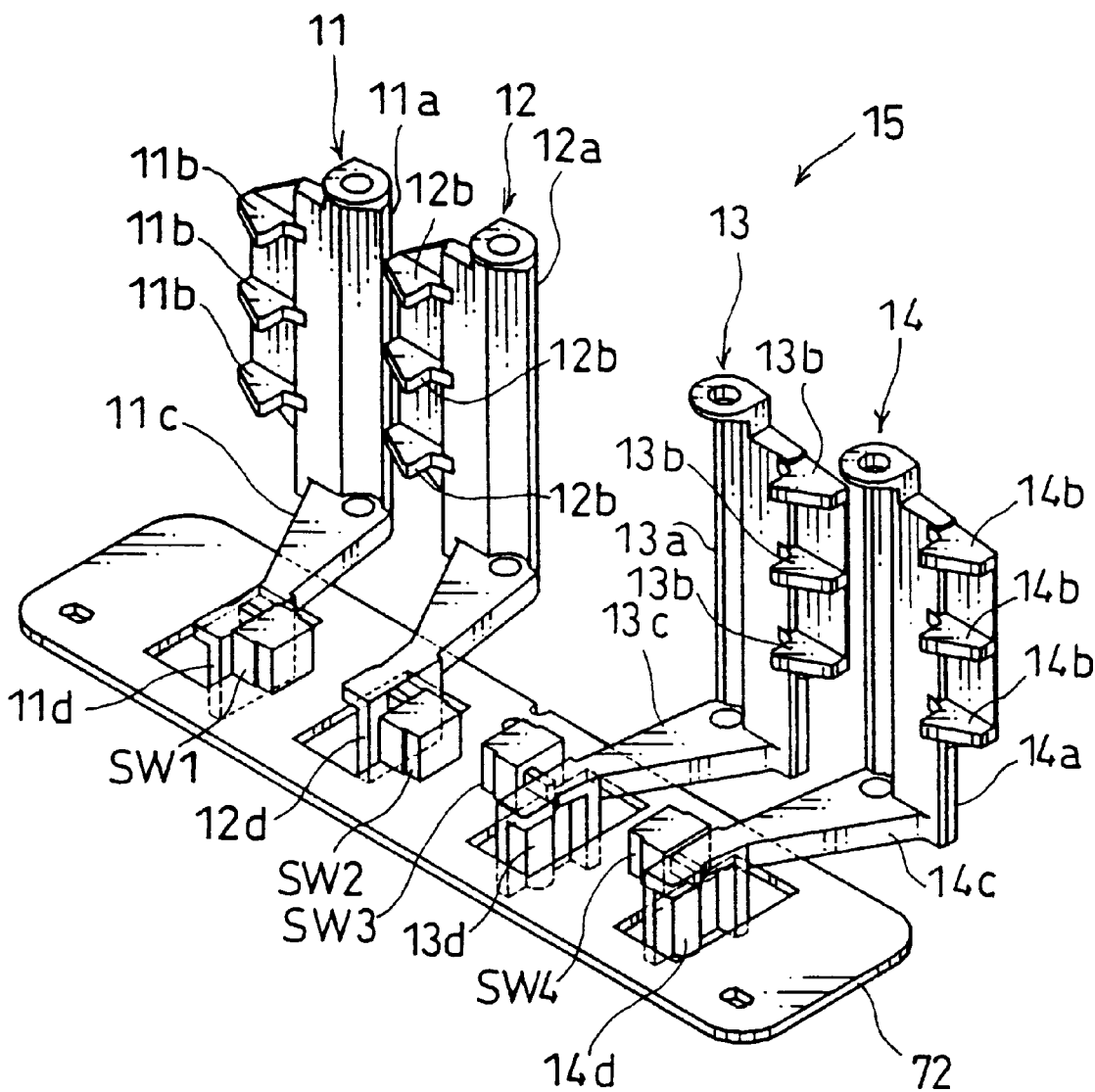
FIG. 23 is a perspective view showing a configuration of a tray position detecting mechanism of the disk loading device shown in FIG. 17.

Similarly to the disk loading device of the first embodiment, the disk loading device of the present embodiment has a tray position detecting mechanism 15 for detecting the operational positions of the tray assemblies 10 as shown in FIG. 23. The tray position detecting mechanism 15 is configured to operate the tray position detecting switches (hereinafter will be referred to as switches) SW1 through SW4 mounted on a base 72 with the respective switch levers 11 through 14. The switch levers 11 through 14 of the present embodiment have basically the same structures as those of the first embodiment, but are formed to operate separately for the individual three tray assemblies 10.

Specifically, the switch lever 11 has three contact sections 11b for contacting the three tray assemblies 10 respectively. The switch levers 12 through 14 also have three contact sections 12b, 13b, and 14b respectively.

The switch SW1 is turned off when one of the lower trays 3 is in the loading and unloading position T1. The switch SW2 is turned on only when the three lower trays 3 are all in the storage position T2. The switch SW3 is turned on when the three upper trays 2 are all in the storage position T2. The switch SW4 is turned off when one of the upper trays 2 is moved backward from the storage position T2.

As described in the first embodiment, the switches SW3 and SW4 and the switch levers 13 and 14 move differently when the upper tray 2 is in the storage position T2, between the storage position T2 and the reproduction position T3, and in the reproduction position T3 (see FIGS. 7(a) through 7(c)). In addition, the switches SW1 and SW2 and the switch levers 11 and 12 move differently when the lower tray 3 is in the storage position T2, between the storage position T2 and the loading and unloading position T1, and in the loading and unloading position T1 (see FIGS. 8(a) through 8(c)).

The three tray assemblies 10 operate in sixteen tray operational modes 1 through 16 (hereinafter will be referred to as modes), shown in Table 1, based on the combinations of ONs and OFFs of the four switches SW1 throughout SW4. The movement of the tray assemblies 10 is controlled through controls of the pinion rotating motor 33 by a controller 81 shown in FIG. 26 in accordance with the combinations of the ONs and OFFs of the switches SW1 throughout SW4. The controller 81 rotates the pinion rotating motor 33 in response to an external instruction, and stops the pinion rotating motor 33 when the upper tray 2 or the lower tray 3 has reached the specified position and the ONs and OFFs of the switches SW1 throughout SW4 in those positions are detected.

Figure 26:
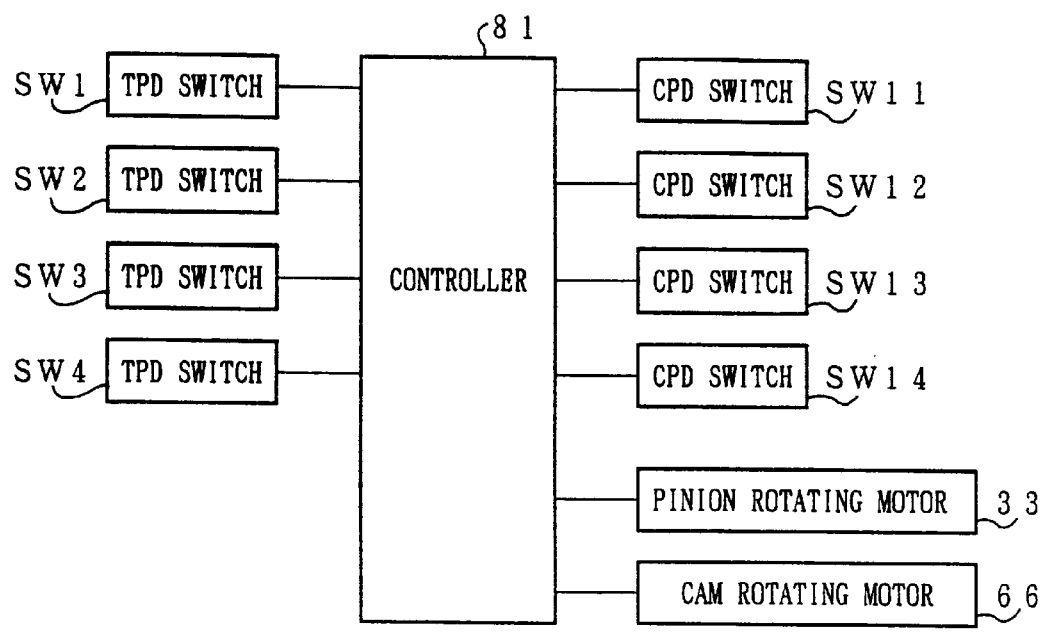
FIG. 26 is a block diagram showing a control system for controlling the disk loading device shown in FIG. 17.

Note that in FIG. 26, the TPD switches represent the tray position detecting switches SW1 through SW4, and the CPD switches represent the cam position detecting tches SW11 through SW14.

TABLE 1

| Tray Opera- tional Mode | Operational States of Tray Position Detecting Switches | | | | Number of Trays in Various Positions (Upper figure for upper trays, and lower figure for lower trays in each cell) | | | | |
|---|---|---|---|---|---|---|---|---|---|
| | SW1 | SW2 | SW3 | SW4 | | | | | |
| | T1: ON | T2: ON | T3: OFF | T1–T2: ON | T1 | Moving T1~T2 | T2 | Moving T2~T3 | T3 |
| Mode 1 | ON | ON | ON | ON | | | 3 3 | | |
| Mode 2 | ON | ON | ON | OFF | | | 2 3 | 1 | |
| Mode 3 | ON | ON | OFF | OFF | | | 2 3 | | 1 |
| Mode 4 | ON | OFF | ON | ON | 1 | 1 | 2 2 | | |
| Mode 5 | OFF | OFF | ON | ON | 1 1 | | 2 2 | | |
| Mode 6 | ON | OFF | OFF | OFF | 1 1 | | 1 2 | | 1 |
| Mode 7 | OFF | OFF | OFF | OFF | 1 1 | | 1 2 | | 1 |
| Mode 8 | ON | OFF | ON | OFF | | 1 | 2 2 | 1 | |
| Mode 9 | OFF | OFF | ON | OFF | 1 1 | | 1 2 | 1 | |
| Mode 10 | ON | ON | OFF | ON | | | Contradictory State | | |
| Mode 11 | OFF | ON | ON | ON | | | Contradictory State | | |
| Mode 12 | ON | OFF | OFF | ON | | | Contradictory State | | |
| Mode 13 | OFF | ON | ON | OFF | | | Contradictory State | | |
| Mode 14 | OFF | ON | OFF | ON | | | Contradictory State | | |
| Mode 15 | OFF | ON | OFF | OFF | | | Contradictory State | | |
| Mode 16 | OFF | OFF | OFF | ON | | | Contradictory State | | |

The following description will explain the modes 1 through 16 in detail.

Mode 1: The switches SW1 through SW4 are all turned on. The upper trays 2 and the lower trays 3 are all in the storage position T2 as shown in FIGS. 7(a) and 8(a).

Mode 2: Only the switch SW4 is turned off, and all the other switches SW1 through SW3 are turned on. One of the upper trays 2 is between the storage position T2 and the reproduction position T3, and the lower tray 3 are all in the storage position T2 as shown in FIGS. 7(b) and 8(a).

Mode 3: The switches SW3 and SW4 are turned off, and the switches SW1 and SW2 are turned on. The lower tray 3 are all in the storage position T2 as shown in FIG. 8(a), and one of the upper trays 2 is in the reproduction position T3 as shown in FIG. 7(c).

Mode 4: Only the switch SW2 is turned off, and all the other switches SW1, SW3 and SW4 are turned on one of the lower trays 3, together with the upper tray 2 forming an assembly with that lower tray 3, is between the storage position T2 and the loading and unloading position T1 as shown in FIG. 8(b), whereas the other upper trays 2 are in the storage position T2 as shown in FIG. 7(a). In other words, this mode is for one of the tray assemblies 10 to move between the storage position T2 and the loading and unloading position T1 to load or unload the disk 6 while the other disks 6 are standing by.

Mode 5: The switches SW1 and SW2 are turned off, and the switches SW3 and SW4 are turned on. One of the lower trays 3, together with the upper tray 2 forming an assembly with that lower tray 3, is in the loading and unloading position T1 as shown in FIG. 8(c), whereas the other upper trays 2 are in the storage position T2 as shown in FIG. 7(a).

Mode 6: Only the switch SW1 is turned on, and all the other switches SW2 through SW4 are turned off. One of the lower trays 3, together with the upper tray 2 forming an assembly with that lower tray 3, is between the loading and unloading position T1 and the storage position T2 as shown in FIG. 8(b), whereas another of the upper trays 2 is in the reproduction position T3 as shown in FIG. 7(c). In other words, this mode is for one of the two tray assemblies 10 not associated with reproduction to move between the storage position T2 and the loading and unloading position T1 to load or unload one of the disks 6 while another of the disks 6 is being reproduced.

Mode 7: The switches SW1 through SW4 are all turned off. One of the lower trays 3, together with the upper tray 2 forming an assembly with that lower tray 3, is in the loading and unloading position T1 as shown in FIG. 8(c), whereas another of the two upper trays 2 is in the reproduction position T3 as shown in FIG. 7(c). In other words, this mode is for one of the two tray assemblies 10 not associated with reproduction to be in the loading and unloading position T1 to load or unload one of the disks 6 while another of the disks 6 is being reproduced.

Mode 8: The switches SW2 and SW4 are turned off, and the switches SW1 and SW3 are turned on. One of the lower tray 3 is between the loading and unloading position T1 and the storage position T2 as shown in FIG. 8(b), and one of the upper tray 2 is between the storage position T2 and the reproduction position T3 as shown in FIG. 7(b). However, when the lower tray 3 is between the loading and unloading position T1 and the storage position T2, the upper tray 2 must be in the conditions shown in FIG. 7(a) or 7(c). Therefore, this mode is structurally impossible.

Mode 9: Only the switch SW3 is turned on, and the other switches SW1, SW2 and SW4 are turned off. One of the lower trays 3, together with the upper tray 2 forming an assembly with that lower tray 3, is in the loading and unloading position T1 as shown in FIG. 8(c), whereas another of the upper trays 2 is between the storage position T2 and the reproduction position T3 as shown in FIG. 7(b). In principle, the disk loading device allows one of the disks 6 to be loaded or unloaded, while the three disks 6 are standing by or while one of the disks 6 is being reproduced. The mode 9, not fitting in with any of the possible conditions, is also treated as structurally impossible.

When the ON & OFF combinations of the switches SW1 through SW4 as in the modes 8 and 9 are detected, the controller 81 treats these modes as error modes.

Besides, as shown in FIGS. 7(c) and 8(c), when the switch SW1 is turned off, the switch SW2 is always turned off also. And when the switch SW3 is turned off, the switch SW4 is always turned off also. Therefore, the ON & OFF combinations of the switches SW1 through SW4 as in the modes 10 through 16 below are structurally impossible (contradictory states). Therefore, when such combinations are detected, the controller 81 treats these modes as error modes.

Mode 10: Only the switch SW3 is turned off, and the other switches SW1, SW2 and SW4 are turned on.

Mode 11: Only the switch SW1 is turned off, and the other switches SW2 through SW4 are turned on.

Mode 12: The switches SW2 and SW3 are turned off, and the switches SW1 and SW4 are turned on.

Mode 13: The switches SW1 and SW4 are turned off, and the switches SW2 and SW3 are turned on.

Mode 14: The switches SW1 and SW3 are turned off, and the switches SW2 and SW4 are turned on.

Mode 15: Only the switch SW2 is turned on, and the other switches SW1, SW3 and SW4 are turned off.

Mode 16: Only the switch SW4 is turned on, and the other switches SW1 through SW3 are turned off.

The following description will explain the movement of the reproducing mechanism unit 5 and the three upper trays 2 derived by the main cam 41 of the disk loading device.

As shown in FIG. 24, the vertical positions of the reproducing mechanism unit 5 and the stabilizer 54 are approximately represented by the turn table 51a and the stabilizer 54. That is, the location of the turn table 51a is expressed by E1 through E6, and that of the stabilizer 54 is expressed by F1 through F3.

Specifically, E1 represents the position of the reproducing mechanism 5 when the disk 6 on the top shelf is being reproduced. E2 represents the position of the reproducing mechanism 5 when the disk 6 is being moved by the upper tray 2 of the top shelf. E3 represents the position of the reproducing mechanism 5 when the disk 6 on the middle shelf is being reproduced. E4 represents the position of the reproducing mechanism 5 when the disk 6 is being moved by the upper tray 2 of the middle shelf. E5 represents the position of the reproducing mechanism 5 when the disk 6 on the bottom shelf is being reproduced. E6 represents the position of the reproducing mechanism 5 when the disk 6 is being moved by the upper tray 2 of the bottom shelf.

F1 represents the position of the stabilizer 54 when the disk 6 on the top shelf is being reproduced and when the disk 6 is being moved by the upper tray 2 of the top shelf. F2 represents the position of the stabilizer 54 when the disk 6 on the middle shelf is being reproduced and when the disk 6 is being moved by the upper tray 2 of the middle shelf. F3 represent s the position of the stabilizer 54 when the disk 6 on the bottom shelf is being reproduced and when the disk 6 is being moved by the upper tray 2 of the bottom shelf.

The positions where the reproducing mechanism unit 5 and the disk securing mechanism 16 are elevated and lowered depend upon the rotation position of the main cam 41. Referring to FIG. 25, the following description will explain those rotation positions and corresponding positions where the turn table 51a and the stabilizer 54 are elevated and lowered.

In FIG. 25, arrows in a solid line, dotted line and alternate long and short dash line for "Ejection of Disk Being Reproduced" represent ejecting a disk that is being reproduced on the top shelf, on the middle shelf, and on the bottom shelf respectively. Arrows in a solid line, dotted line and alternate long and short dash line for "Ejection of Disk While Reproducing Another (α)" represent ejecting a disk on the middle shelf, on the bottom shelf, and on the top shelf while reproducing another disk on the top shelf, on the middle shelf, and on the bottom shelf respectively. Arrows in a solid line, dotted line and alternate long and short dash line for "Ejection of Disk While Reproducing Another (β)" represent ejecting a disk on the bottom shelf, on the top shelf, and on the middle shelf while reproducing another disk on the top shelf, on the middle shelf, and on the bottom shelf respectively.

In FIG. 25, "ON" and "OFF" for the pinions 21 and 22 represent that the pinions 21 and 22 are and are not in engagement respectively. "ON" and "OFF" for the upper and lower trays 2 and 3 represent that the lock claws 36b and 36c are and are not holding the upper and lower trays 2 and 3 respectively.

Rotation positions P1 through P13 of the main cam 41 (will be described later in detail) correspond, as shown in Table 2, to the combinations of ONs and OFFs of the switches SW11 through SW14 and the modes.

TABLE 2

| Rotation Positions | SW11 | SW12 | SW13 | SW14 | Corresponding Tray Operational Modes |
|---|---|---|---|---|---|
| P1 | OFF | OFF | OFF | ON | Modes 1, 4, 5 |
| P2 | OFF | ON | OFF | OFF | Modes 1, 2, 3 |
| P3 | OFF | ON | OFF | ON | Mode 3 |
| P4 | OFF | ON | ON | ON | Modes 1, 3, 4, 5, 6, 7 |
| P5 | OFF | ON | ON | OFF | Modes 1, 3, 4, 5, 6, 7 |
| P6 | ON | OFF | OFF | OFF | Modes 1, 2, 3 |
| P7 | ON | OFF | ON | OFF | Mode 3 |
| P8 | ON | OFF | OFF | ON | Modes 1, 3, 4, 5, 6, 7 |
| P9 | ON | OFF | ON | ON | Modes 1, 3, 4, 5, 6, 7 |
| P10 | ON | ON | OFF | OFF | Modes 1, 2, 3 |
| P11 | ON | ON | ON | ON | Mode 3 |
| P12 | ON | ON | ON | OFF | Modes 1, 3, 4, 5, 6, 7 |
| P13 | ON | ON | OFF | ON | Modes 1, 3, 4, 5, 6, 7 |
| Between Rotation Positions | OFF | OFF | OFF | OFF | Mode 1 |

Rotation position P1: Only the switch SW14 is turned on, and the switches SW11 through SW13 are turned off. The upper tray 2 on the bottom shelf can be moved between the loading and unloading position T1 and the storage position T2 (modes 1, 4, 5). The turn table 51a is in the position E6, and the stabilizer 54 is in the position F3. Only the pinion 21 on the bottom shelf engages the rack 2h of the upper tray 2 on the bottom shelf. The upper trays 2 on the top shelf and on the middle shelf, excluding the upper tray 2 on the bottom shelf, are held by the respective lock claws 36b, and the lower trays 3 on the top shelf and on the middle shelf, excluding the lower tray 3 on the bottom shelf, are held by the respective lock claws 36c.

Rotation position P2: Only the switch SW12 is turned on, and the switches SW11, SW13 and SW14 are turned off. The upper tray 2 on the bottom shelf can be moved between the storage position T2 and the reproduction position T3 (modes 1, 2, 3). The turn table 51a is in the position E6, and the stabilizer 54 is in the position F3. Only the pinion 22 on the bottom shelf engages the rack 2h of the upper tray 2 on the bottom shelf. The upper trays 2 on the top shelf and on the middle shelf, excluding the upper tray 2 on the bottom shelf, are held by the respective lock claws 36b, and all the lower trays 3 are held by the respective lock claws 36c.

Rotation position P3: The switches SW12 and SW14 are turned on, and the switches SW11 and SW13 are turned off.

Since the turn table 51a is in the position E5, and the stabilizer 54 is in the position F3, the disk 6 on the bottom shelf can be reproduced (mode 3). None of the three pairs of pinions 21 and 22 engages the racks 2h of the upper trays 2. The upper trays 2 on the top shelf and on the middle shelf, excluding the upper tray 2 on the bottom shelf, are held by the respective lock claws 36b, and all the lower trays 3 are held by the respective lock claws 36c.

Rotation position P4: Only the switch SW11 is turned off, and the switches SW12 through SW14 are turned on. Since the turn table 51a is in the position E5, and the stabilizer 54 is in the position F3, if the upper tray 2 on the bottom shelf moves the disk 6 to the reproduction position T3, the disk 6 can be reproduced on the bottom shelf. Besides, the upper tray 2 on the top shelf can be moved between the loading and unloading position T1 and the storage position T2 (modes 1, 3, 4, 5, 6, and 7). Only the pinion 21 on the top shelf engages the rack 2h of the upper tray 2 on the top shelf. For the modes 1, 4 and 5, the upper trays 2 on the middle shelf and on the bottom shelf, excluding the upper tray 2 on the top shelf, are held by the respective lock claws 36b, and for the modes 3, 6 and 7, only the upper tray 2 on the middle shelf is held by the lock claw 36b. The lower trays 3 on the middle shelf and on the bottom shelf, excluding the lower tray 3 on the top shelf, are held by the respective lock claws 36c for the modes 1, 3, 4, 5, 6, and 7.

Rotation position P5: The switches SW12 and SW13 are turned on, and the switches SW11 and SW14 are turned off. Since the turn table 51a is in the position E5, and the stabilizer 54 is in the position F3, if the upper tray 2 on the bottom shelf moves the disk 6 to the reproduction position T3, the disk 6 can be reproduced on the bottom shelf. Besides, the upper tray 2 on the middle shelf can be moved between the loading and unloading position T1 and the storage position T2 (modes 1, 3, 4, 5, 6, and 7). Only the pinion 21 on the middle shelf engages the rack 2h of the upper tray 2 on the middle shelf. For the modes 1, 4 and 5, the upper trays 2 on the top shelf and on the bottom shelf, excluding the upper tray 2 on the middle shelf, are held by the respective lock claws 36b, and for the modes 3, 6 and 7, only the upper tray 2 on the top shelf is held by the lock claw 36b. The lower trays 3 on the top shelf and on the bottom shelf, excluding the lower tray 3 on the middle shelf, are held by the respective lock claws 36c for the modes 1, 3, 4, 5, 6, and 7.

Rotation position P6: Only the switch SW11 is turned on, and the switches SW12 through SW14 are turned off. The upper tray 2 on the middle shelf can be moved between the storage position T2 and the reproduction position T3 (modes 1, 2, 3). The turn table 51a is in the position E4, and the stabilizer 54 is in the position F2. Only the pinion 22 on the middle shelf engages the rack 2h of the upper tray 2 on the middle shelf. The upper trays 2 on the top shelf and on the bottom shelf, excluding the upper tray 2 on the middle shelf, are held by the respective lock claws 36b, and all the lower trays 3 are held by the respective lock claws 36c.

Rotation position P7: The switches SW11 and SW13 are turned on, and the switches SW12 and SW14 are turned off. Since the turn table 51a is in the position E3, and the stabilizer 54 is in the position F2, the disk 6 can be reproduced on the middle shelf (mode 3). None of the three pairs of pinions 21 and 22 engages the racks 2h of all the upper trays 2. The upper trays 2 on the top shelf and on the bottom shelf, excluding the upper tray 2 on the middle shelf, are held by the respective lock claws 36b, and all the lower trays 3 are held by the respective lock claws 36c.

Rotation position P8: The switches SW11 and SW14 are turned on, and the switches SW12 and SW13 are turned off. Since the turn table 51a is in the position E3, and the stabilizer 54 is in the position F2, if the upper tray 2 on the middle shelf moves the disk 6 to the reproduction position T3, the disk 6 can be reproduced on the middle shelf. Besides, the upper tray 2 on the bottom shelf can be moved between the loading and unloading position T1 and the storage position T2 (modes 1, 3, 4, 5, 6, and 7). Only the pinion 21 on the bottom shelf engages the rack 2h of the upper tray 2 on the bottom shelf. For the modes 1, 4 and 5, the upper trays 2 on the top shelf and on the middle shelf, excluding the upper tray 2 on the bottom shelf, are held by the respective lock claws 36b, and for the modes 3, 6 and 7, only the upper tray 2 on the top shelf is held by the lock claw 36b. The lower trays 3 on the top shelf and on the middle shelf, excluding the lower tray 3 on the bottom shelf, are held by the respective lock claws 36c for the modes 1, 3, 4, 5, 6, and 7.

Rotation position P9: Only the switch SW12 is turned off, and the switches SW11, SW13 and SW14 are turned on. Since the turn table 51a is in the position E3, and the stabilizer 54 is in the position F2, if the upper tray 2 on the middle shelf moves the disk 6 to the reproduction position T3, the disk 6 can be reproduced on the middle shelf. Besides, the upper tray 2 on the top shelf can be moved between the loading and unloading position T1 and the storage position T2 (modes 1, 3, 4, 5, 6, and 7). Only the pinion 21 on the top shelf engages the rack 2h of the upper tray 2 on the top shelf. For the modes 1, 4 and 5, the upper trays 2 on the middle shelf and on the bottom shelf, excluding the upper tray 2 on the top shelf, are held by the respective lock claws 36b, and for the modes 3, 6 and 7, only the upper tray 2 on the bottom shelf is held by the lock claw 36b. The lower trays 3 on the middle shelf and on the bottom shelf, excluding the lower tray 3 on the top shelf, are held by the respective lock claws 36c for the modes 1, 3, 4, 5, 6, and 7.

Rotation position P10: The switches SW11 and SW12 are turned on, and the switches SW13 and SW14 are turned off. The upper tray 2 on the top shelf can be moved between the storage position T2 and the reproduction position T3 (modes 1, 2, 3). The turn table 5a is in the position E2, and the stabilizer 54 is in the position F1. Only the pinion 22 on the top shelf engages the rack 2h of the upper tray 2 on the top shelf. The upper trays 2 on the middle shelf and on the bottom shelf, excluding the upper tray 2 on the top shelf, are held by the respective lock claws 36b, and all the lower trays 3 are held by the respective lock claws 36c.

Rotation position P11: The switches SW11 through SW14 are all turned on. Since the turn table 51a is in the position E1, and the stabilizer 54 is in the position F1, the disk 6 can be reproduced on the top shelf (mode 3). None of the three pairs of pinions 21 and 22 engages the racks 2h of the upper trays 2. The upper trays 2 on the middle shelf and on the bottom shelf, excluding the upper tray 2 on the top shelf, are held by the respective lock claws 36b, and all the lower trays 3 are held by the respective lock claws 36c.

Rotation position P12: Only the switch SW14 is turned off, and the switches SW11 through SW13 are turned on. Since the turn table 51a is in the position E1, and the stabilizer 54 is in the position F1, if the upper tray 2 on the top shelf moves the disk 6 to the reproduction position T3, the disk 6 can be reproduced on the top shelf. Besides, the upper tray 2 on the middle shelf can be moved between the loading and unloading position T1 and the storage position T2 (modes 1, 3, 4, 5, 6, and 7). Only the pinion 21 on the middle shelf engages the rack 2h of the upper tray 2 on the middle shelf. For the modes 1, 4 and 5, the upper trays 2 on the top shelf and on the bottom shelf, excluding the upper tray 2 on the middle shelf, are held by the respective lock claws 36b, and for the modes 3, 6 and 7, only the upper tray 2 on the bottom shelf is held by the lock claw 36b. The lower trays 3 on the top shelf and on the bottom shelf, excluding the lower tray 3 on the middle shelf, are held by the respective lock claws 36c for the modes 1, 3, 4, 5, 6, and 7.

Rotation position P13: Only the switch SW13 is turned off, and the switches SW11, SW12 and SW14 are turned on. Since the turn table 51a is in the position E1, and the stabilizer 54 is in the position F1, if the upper tray 2 on the top shelf moves the disk 6 to the reproduction position T3, the disk 6 can be reproduced on the top shelf. Besides, the upper tray 2 on the bottom shelf can be moved between the loading and unloading position T1 and the storage position T2 (modes 1, 3, 4, 5, 6, and 7). Only the pinion 21 on the bottom shelf engages the rack 2h of the upper tray 2 on the bottom shelf. For the modes 1, 4 and 5, the upper trays 2 on the top shelf and on the middle shelf, excluding the upper tray 2 on the bottom shelf, are held by the respective lock claws 36b, and for the modes 3, 6 and 7, only the upper tray 2 on the middle shelf is held by the lock claw 36b. The lower trays 3 on the top shelf and on the middle shelf, excluding the lower tray 3 on the bottom shelf, are held by the respective lock claws 36c for the modes 1, 3, 4, 5, 6, and 7.

Between Rotation Positions: The switches SW11 through SW14 are all turned off. Between the rotation positions P3 and P4, and between the rotation positions P3 and P5, the upper tray 2 stays in the reproduction position T3. The upper tray 2 stays in the reproduction position T3, either, between the rotation positions P7 and P8, between the rotation positions P7 and P9, between the rotation positions P11 and P12, and between the rotation positions P11 and P13.

The controller 81 controls the rotation of the main cam 41 through the controls of the movement of the cam rotating motor 66. More specifically, the controller 81 rotates the cam rotating motor 66 in response to an external instruction, and then stops the cam rotating motor 66 when all the switches SW11 through SW14, initially all in the OFF states, have reached the respective ON and OFF states corresponding to the specified rotation position. The controller 81 also controls the movement of the pinion rotating motor 33 so that the pinion rotating motor 33 drives the upper tray 2 and the lower tray 3 to the position specified by an external instruction for the mode corresponding to the rotation position.

Referring to FIG. 25, the following description will explain the rotation positions and transitions between the modes in real operation.

First, the transition from the reproduction state on one of the shelves to the reproduction state on another shelf will be first explained.

As to the transition of the reproduction state from the top shelf to the middle shelf, as a result of the rotation of the main cam 41 from the rotation position P11 and the mode 3 to the rotation position P10, the turn table 51a moves to the position E2, and the upper tray 2 on the top shelf moves from the reproduction position T3 to the storage position T2. The tray operational mode thereby transits from the mode 3 via the mode 2 to the mode 1.

Next, as a result of the rotation of the main cam 41 from the rotation position P10 to the rotation position P6, the turn table 51a moves to the position E4, and the stabilizer 54 moves to the position F2. Then the upper tray 2 on the middle shelf moves from the storage position T2 to the reproduction position T3. The tray operational mode thereby transits from the mode 1 via the mode 2 to the mode 3. Then as the main cam 41 moves from the rotation position P6 to the rotation position P7, the turn table 51a moves to the position E3.

As to the transition of the reproduction state from the middle shelf to the top shelf, the main cam 41 operates in the reverse sequence from the foregoing.

As to the transition of the reproduction state from the middle shelf to the bottom shelf, as a result of the rotation of the main cam 41 from the rotation position P7 and the mode 3 to the rotation position P6, the turn table 51a moves to the position E4, and the upper tray 2 on the middle shelf moves from the reproduction position T3 to the storage position T2. The tray operational mode thereby transits from the mode 3 via the mode 2 to the mode 1.

Next, as a result of the rotation of the main cam 41 from the rotation position P6 to the rotation position P2, the turn table 51a moves to the position E6 on the bottom shelf, and the stabilizer 54 moves to the position F3. Then the upper tray 2 on the bottom shelf moves from the storage position T2 to the reproduction position T3. The tray operational mode thereby transits from the mode 1 via the mode 2 to the mode 3. Then as the main cam 41 moves from the rotation position P2 to the rotation position P3, the turn table 51a moves to the position E5.

As to the transition of the reproduction state from the bottom shelf to the middle shelf, the main cam 41 operates in the reverse sequence from the foregoing.

As to the transition of the reproduction state from the bottom shelf to the top shelf, as a result of the rotation of the main cam 41 from the rotation position P3 and the mode 3 to the rotation position P2, the turn table 51a moves to the position E6, and the upper tray 2 on the bottom shelf moves from the reproduction position T3 to the storage position T2. The tray operational mode thereby transits from the mode 3 via the mode 2 to the mode 1.

Next, as a result of the rotation of the main cam 41 from the rotation position P2 to the rotation position P10, the turn table 51a moves to the position E2, and the stabilizer 54 moves to the position F1. Then the upper tray 2 on the top shelf moves from the storage position T2 to the reproduction position T3. The tray operational mode thereby transits from the mode 1 via the mode 2 to the mode 3. Then as the main cam 41 moves from the rotation position P10 to the rotation position P11, the turn table 51a moves to the position E1.

As to the transition of the reproduction state from the top shelf to the bottom shelf, the main cam 41 operates in the reverse sequence from the foregoing.

The transition from the reproduction state to the loading and unloading state on each of the three shelves will be explained next.

As to the transition from the reproduction state to the loading and unloading state on the top shelf, as a result of the rotation of the main cam 41 from the rotation position P11 and the mode 3 to the rotation position P10, the turn table 51a moves to the position E2, and the upper tray 2 on the top shelf moves from the reproduction position T3 to the storage position T2. The tray operational mode thereby transits from the mode 3 via the mode 2 to the mode 1.

Next, as a result of the rotation of the main cam 41 from the rotation position P10 to the rotation position P9, the turn table 51a moves to the position E3 and the stabilizer 54 moves to the position F2. Then the upper tray 2 on the top shelf moves from the storage position T2 to the loading and unloading position T1. The tray operational mode thereby transits from the mode 1 via the mode 4 to the mode 5.

As to the transition from the loading and unloading state to the reproduction state on the top shelf, the main cam 41 operates in the reverse sequence from the foregoing.

As to the transition from the reproduction state to the loading and unloading state on the middle shelf, as a result of the rotation of the main cam 41 from the rotation position P7 and the mode 3 to the rotation position P6, the turn table 51a moves to the position E4, and the upper tray 2 on the middle shelf moves from the reproduction position T3 to the storage position T2. The tray operational mode thereby transits from the mode 3 via the mode 2 to the mode 1.

Next, as a result of the rotation of the main cam 41 from the rotation position P6 to the rotation position P5, the turn table 51a moves to the position E5, and the stabilizer 54 moves to the position F3. Then the upper tray 2 on the middle shelf moves from the storage position T2 to the loading and unloading position T1. The tray operational mode thereby transits from the mode 1 via the mode 4 to the mode 5.

As to the transition from the loading and unloading state to the reproduction state on the middle shelf, the main cam 41 operates in the reverse sequence from the foregoing.

As to the transition from the reproduction state to the loading and unloading state on the bottom shelf, as a result of the rotation of the main cam 41 from the rotation position P3 and the mode 3 to the rotation position P2, the turn table 51a moves to the position E6, and the upper tray 2 on the bottom shelf moves from the reproduction position T3 to the storage position T2. The tray operational mode thereby transits from the mode 3 via the mode 2 to the mode 1.

Next, as a result of the rotation of the main cam 41 from the rotation position P2 to the rotation position P1, the upper tray 2 on the bottom shelf moves from the storage position T2 to the loading and unloading position T1, while the turn table 51a is staying in the position E6 and the stabilizer 54 is staying in the position F3. The tray operational mode thereby transits from the mode 1 via the mode 4 to the mode 5.

As to the transition from the loading and unloading state to the reproduction state on the bottom shelf, the main cam 41 operates in the reverse sequence from the foregoing.

The transition to the loading and unloading state on one of the three shelves that is carried out at the same time as the reproduction state on another shelf will be explained next.

As to the transition from the storage position T2 to the loading and unloading position T1 of the middle and bottom shelves that is carried out at the same time as the reproduction state on the top shelf, as a result of the rotation of the main cam 41 from the rotation position P11 (Mode 3) to the rotation position P12 (middle shelf) or the rotation position P13 (bottom shelf), the turn table 51a and the stabilizer 54 are maintained in horizontal states, and the upper tray 2 on the middle or bottom shelf moves from the storage position T2 to the loading and unloading position T1. The tray operational mode thereby transits from the mode 3 via the mode 6 to the mode 7.

As to the transition from the loading and unloading position T1 to the storage position T2 of the middle and bottom shelves that is carried out at the same time as the reproduction state on the top shelf, the main cam 41 operates in the reverse sequence from the foregoing.

As to the transition from the storage position T2 to the loading and unloading position T1 of the top and bottom shelves that is carried out at the same time as the reproduction state on the middle shelf, as a result of the rotation of the main cam 41 from the rotation position P7 (mode 3) to the rotation position P9 (top shelf) or the rotation position P8 (bottom shelf), the turn table 51a and the stabilizer 54 are maintained in horizontal states, and the upper tray 2 on the top or bottom shelf moves from the storage position T2 to the loading and unloading position T1. The tray operational mode thereby transits from the mode 3 via the mode 6 to the mode 7.

As to the transition from the loading and unloading position T1 to the storage position T2 of the top and bottom shelves that is carried out at the same time as the reproduction state on the middle shelf, the main cam 41 operates in the reverse sequence from the foregoing.

As to the transition from the storage position T2 to the loading and unloading position T1 of the top and middle shelves that is carried out at the same time as the reproduction state on the bottom shelf, as a result of the rotation of the main cam 41 from the rotation position P3 (mode 3) to the rotation position P4 (top shelf) or the rotation position P5 (middle shelf), the turn table 51a and the stabilizer 54 are maintained in horizontal states, and the upper tray 2 on the top or middle shelf moves from the storage position T2 to the loading and unloading position T1. The tray operational mode thereby transits from the mode 3 via the mode 6 to the mode 7.

As to the transition from the loading and unloading position T1 to the storage position T2 of the top and middle shelves that is carried out at the same time as the reproduction state on the bottom shelf, the main cam 41 operates in the reverse sequence from the foregoing.

As described above, since the disk loading device controls all the movement of the tray assemblies 10, the reproducing mechanism unit 5, and the disk securing mechanism 16 through the main cam 41, the disk loading device can move the upper trays 2 in the same manner irrelevantly to the number of the upper trays 2. Therefore if the present invention is applied to a disk loading device that stores more than three disks 6, the effect of reduction in size becomes evident, compared to conventional disk loading devices.

The disk loading device further includes the tray position detecting mechanism 15 for simultaneously detecting the positions of the upper trays 2 and the rotation position detecting mechanism (rotation position detecting cams 41d) for detecting the rotation position of the reproducing mechanism elevating and lowering cams 41b.

With the above configuration, as described above, since the reproducing mechanism elevating and lowering cams 41b are provided integrally with the pinion turning cams 41a and the securing mechanism elevating and lowering cam 41c, the movements of these cams are collectively detected by the rotation position detecting mechanism as rotation positions of the reproducing mechanism elevating and lowering cams 41b. Since the tray positions are the only additional information required to control the loading operation, the disk loading device can collect all the necessary information only by incorporating the tray position detecting mechanism 15 for detecting the tray positions. Therefore, it is possible to make simple the configuration of the detecting device and to collectively process the information required for the controls.

Consequently, it is possible to collectively and effectively control the loading operation composed of the movements of the upper trays 2, the reproducing mechanism unit 5, etc., to reduce the number of components, and to cut the price of the disk loading device.

The invention being thus described, it will be obvious that the same may be varied in many ways. Such variations are not to be regarded as a departure from the spirit and scope of the invention, and all such modifications as would be obvious to one skilled in the art intended to be included within the scope of the

What is claimed is:

1. A disk loading device, comprising:

a first tray provided so as to be freely movable with a disk thereon among a loading and unloading position for allowing loading and unloading of said disk outside a housing, a storage position for storing said disk inside said housing, and a reproduction position for reproducing information from said disk at a back of said storage position in said housing;

a second tray provided so as to be movable with said first tray, only by being held by said first tray between said loading and unloading position and said storage position;

tray driving means, directly connectable only with said first tray, for directly driving and reciprocally moving said first tray among all of said three positions;

a holding member for holding said second tray to said first tray; and hold releasing means for releasing the hold by said holding member when said first tray moves from said storage position to said reproduction position.

2. The disk loading device as defined in claim 1, wherein said holding member includes:

a lever main body supported by said second tray so as to turn freely, said lever main body having a head and being pressed by a spring so that said head sticks out; and a protrusion section for being caught between said loading and unloading position and said storage position by a stopper provided on said first tray, so as to be prevented from turning outward, said hold releasing means including a hold releasing cam for pushing said head of said holding member inward so that said protrusion section is released from said stopper between said storage position and said reproduction position.

3. The disk loading device as defined in claim 1, wherein said tray driving means includes:

two pinions for engaging a rack provided on said first tray;

a motor as a drive power source for driving and rotating said pinions;

a drive force transmitting mechanism for transmitting drive force of said motor to said pinions; and pinion turning means for turning, around a midpoint of said pinions, said pinions to a first position where said pinions engage said rack and a second position where said pinions do not engage said rack.

4. The disk loading device as defined in claim 3, wherein said second tray includes an auxiliary rack for, together with said rack, engaging said pinions near a place where said holding member holds said second tray onto said first tray.

5. The disk loading device as defined in claim 4, wherein said holding member includes:

a lever main body supported by said second tray so as to turn freely, said lever main body having a head and being pressed by a spring so that said head sticks out; and a protrusion section for being caught between said loading and unloading position and said storage position by a stopper provided on said first tray, so as to be prevented from turning outward, said hold releasing means including a hold releasing cam for pushing said head of said holding member inward so that said protrusion section is released from said stopper between said storage position and said reproduction position, wherein said auxiliary rack and said rack both engage said pinions only between said storage position and a release starting position where said stopper begins to release said protrusion section.

6. The disk loading device as defined in claim 4, wherein said tray driving means includes:

a claw-shaped member, being turned together with said pinions by said pinion turning means, for colliding with a convexity provided on said first tray so as to prevent said first tray from moving when neither of said pinions engage said rack, said convexity having such a structure as to collide with an end portion of said auxiliary rack, in order to prevent said first tray from moving to said loading and unloading position.

7. The disk loading device as defined in claim 3, wherein said drive force transmitting mechanism includes:

a pinion pulley provided at the midpoint of said pinions; and a pinion drive belt wound around said pinions and said pinion pulley.

8. The disk loading device as defined in claim 3, wherein said drive force transmitting mechanism includes:

a pinion gear provided at the midpoint of said pinions;

at least one first gear for engaging said pinion gear and one of said pinions; and at least one second gear for engaging said pinion gear and another of said pinions.

9. The disk loading device as defined in claim 3, wherein said tray driving means includes:

a second tray movement preventing member for being turned together with said pinions by said pinion turning means so as to prevent said second tray from moving when neither of said pinions engages said rack, and when said pinions engage said rack so as to allow said first tray to move between said storage position and reproduction position.

10. The disk loading device as defined in claim 9, wherein said second tray movement preventing member is a claw-shaped member for being caught by a notch provided on said second tray.

11. The disk loading device as defined in claim 3, wherein said tray driving means includes:

a first tray movement preventing member for being turned together with said pinions by said pinion turning means so as to prevent said first tray from moving when neither of said pinions engages said rack.

12. The disk loading device as defined in claim 11, wherein said first tray movement preventing member is a claw-shaped member for colliding with a convexity provided on said first tray.

13. The disk loading device as defined in claim 3, further comprising:

a reproducing mechanism for reproducing information recorded on said disk by rotating said disk in said reproduction position; and a reproducing mechanism elevating and lowering cam for, by rotation thereof, elevating and lowering said reproducing mechanism to predetermined positions for reproduction and disk movement, wherein said pinion turning means includes pinion turning cams formed integrally with said reproducing mechanism elevating and lowering cam so as to turn said pinions in conjunction with the rotation of said reproducing mechanism elevating and lowering cam.

14. The disk loading device as defined in claim 13, further comprising:

a securing mechanism, provided separately from said reproducing mechanism and guided by said housing so as to move toward an axis of said disk, for securing said disk in such a manner that said disk can be rotated for reproduction;

a securing mechanism elevating and lowering cam formed integrally with said reproducing mechanism elevating and lowering cam so as to elevate and lower said securing mechanism according to the rotation of said reproducing mechanism elevating and lowering cam, wherein said reproducing mechanism contacts said reproducing mechanism elevating and lowering cam so as to move toward the axis of said disk when being elevated and lowered according to the rotation of said reproducing mechanism elevating and lowering cam and so as to maintain a horizontal posture thereof when being elevated and lowered and when sitting still.

15. The disk loading device as defined in claim 14, further comprising:

a main cam, of a cylinder shape, driven and rotated around said reproducing mechanism, wherein said reproducing mechanism elevating and lowering cam and said securing mechanism elevating and lowering cam are provided as grooves on an inner circumferential surface of said main cam, said reproducing mechanism includes at least one first pin for being caught by said reproducing mechanism elevating and lowering cam, said securing mechanism includes at least one second pin for being caught by said securing mechanism elevating and lowering cam, and said pinion turning cams are provided as convexities and concavities on an outer circumferential surface of said main cam.

16. The disk loading device as defined in claim 14, wherein said first and second tray form a pair, pairs of first and second trays being stacked in said housing, and said reproducing mechanism elevating and lowering cam has a horizontally formed horizontal segment so as to maintain said reproducing mechanism at a constant height.

17. The disk loading device as defined in claim 16, wherein said reproducing mechanism elevating and lowering cam has a slope segment formed obliquely so as to elevate and lower said reproducing mechanism.

18. The disk loading device as defined in claim 16, further comprising:

a tray position detecting mechanism for simultaneously detecting the positions of said first trays; and a rotation position detecting mechanism for detecting rotation positions of said reproducing mechanism elevating and lowering cam.

19. The disk loading device as defined in claim 18, further comprising:

a main cam, of a cylinder shape, driven and rotated around said reproducing mechanism, having a rotation position detection cam provided on an outer circumferential surface thereof for detecting rotation positions of said main cam.

20. The disk loading device as defined in claim 19, wherein said tray position detecting mechanism includes:

a switch lever pressed and turned by a position detecting cam provided on a side of said first tray; and a tray position detecting switch turned on and off by said switch lever, said rotation position detecting mechanism including said rotation position detecting cam, and a cam position detecting switch turned on and off depending upon contact and non-contact with said rotation position detecting cam.

21. The disk loading device as defined in claim 19, wherein said reproducing mechanism elevating and lowering cam and said securing mechanism elevating and lowering cam are provided as grooves on said inner circumferential surface of said main cam, said reproducing mechanism includes at least one first pin for being caught by said reproducing mechanism elevating and lowering cam, said securing mechanism includes at least one second pin for being caught by said securing mechanism elevating and lowering cam, and said pinion turning cams are provided as convexities and concavities on said outer circumferential surface of said main cam.

22. A disk loading device comprising:

a first tray for carrying a disk and being freely movable between a reproduction position and a storage position within a housing of the disk loading device and a loading/unloading position exterior of the housing;

a driving mechanism connectable only with said first tray, for directly driving said first tray between each of the loading/unloading, storage and reproduction positions; and a second tray movable between the loading/unloading position and the storage position while attached to said first tray to remain in the storage position when said first tray is driven to the reproduction position, wherein the second tray is movable with said first tray only by being held by said first tray.

23. The disk loading device of claim 22, wherein said second tray includes a holding mechanism for holding said second tray to said first tray as said first tray is directly driven between the loading/unloading position and the storage position by said driving mechanism.

24. The disk loading device of claim 23, wherein said holding mechanism comprises a locking lever pivotable about on axis to secure said second tray to said first tray, the disk loading device further comprising a hold releasing cam extending from the housing for pushing a head of the locking lever which protrudes from said second tray inward to release said second tray from said first tray as said first tray is directly driven by said driving mechanism from the storage position to the reproduction position.

25. The disk loading device of claim 22, wherein said first tray is an upper tray within the housing and the second tray is a lower tray within the housing.

26. The disk loading device of claim 22, wherein said first tray includes a rack along an outer surface thereof, said driving mechanism comprising a pinion detachably cooperable with the rack for directly driving said first tray.

* * * * *